US010015319B2

(12) United States Patent
Okanoue et al.

(10) Patent No.: US 10,015,319 B2
(45) Date of Patent: Jul. 3, 2018

(54) COMMUNICATION PROCESSING SYSTEM, COMMUNICATION PROCESSING METHOD, COMMUNICATION PROCESSING DEVICE, COMMUNICATION TERMINAL, AND CONTROL METHOD AND CONTROL PROGRAM THEREFOR

(71) Applicant: NEC Corporation, Minato-ku, Tokyo (JP)

(72) Inventors: Kazuhiro Okanoue, Tokyo (JP); Hiroshi Terasaki, Tokyo (JP); Yoshihiro Kojima, Tokyo (JP); Kenichi Utsuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 14/762,337

(22) PCT Filed: Oct. 22, 2013

(86) PCT No.: PCT/JP2013/078568
§ 371 (c)(1),
(2) Date: Jul. 21, 2015

(87) PCT Pub. No.: WO2014/115386
PCT Pub. Date: Jul. 31, 2014

(65) Prior Publication Data
US 2015/0358474 A1    Dec. 10, 2015

(30) Foreign Application Priority Data
Jan. 25, 2013   (JP) .................................. 2013-012680

(51) Int. Cl.
*H04M 1/00*       (2006.01)
*H04M 7/00*       (2006.01)
(Continued)

(52) U.S. Cl.
CPC .......... *H04M 7/0075* (2013.01); *H04M 3/02* (2013.01); *H04M 3/42008* (2013.01); *H04M 3/42059* (2013.01)

(58) Field of Classification Search
CPC ...... H04M 15/08; H04M 15/09; H04M 15/85; H04M 15/854; H04M 17/02; H04M 17/10; H04M 3/229; H04M 3/4228
(Continued)

(56) References Cited

U.S. PATENT DOCUMENTS

2013/0130669 A1*  5/2013  Xiao ................. H04M 1/72566
                                                    455/418
2014/0106699 A1*  4/2014  Chitre ................ H04W 76/007
                                                    455/404.1
2014/0146955 A1*  5/2014  Ibrahim ................ H04M 3/229
                                                    379/114.2

FOREIGN PATENT DOCUMENTS

JP    2005-151441 A    6/2005
JP    2007-123971 A    5/2007
(Continued)

OTHER PUBLICATIONS

International Search Report for PCT Application No. PCT/JP2013/078568, dated Jan. 28, 2014.
(Continued)

Primary Examiner — Solomon Bezuayehu

(57) ABSTRACT

This system pertains to a communication processing system that effectively makes phone conversations possible from a communication terminal even in a non-business mode that does not identify a user. The communication processing system is provided with the following: a communication terminal; a storage unit that is provided inside the communication terminal or outside the communication terminal, and that stores the association between the communication terminal user-information and customer number, and stores
(Continued)

a role number for the communication terminal; and an outgoing call relay unit that, in a case where the communication terminal is being used in a business mode that identifies the user thereof, relays an outgoing call from a call origination communication terminal to the communication terminal corresponding to the customer number, and that, in a case where the communication terminal is being used in a non-business mode that does not identify the user thereof, relays an outgoing call from the call origination communication terminal to the communication terminal corresponding to the role number.

10 Claims, 30 Drawing Sheets

(51) Int. Cl.
*H04M 3/42* (2006.01)
*H04M 3/02* (2006.01)
*H04M 11/00* (2006.01)

(58) Field of Classification Search
USPC .................................. 379/88.01–88.19, 352
See application file for complete search history.

(56) References Cited

FOREIGN PATENT DOCUMENTS

| | | |
|---|---|---|
| JP | 2007-142621 A | 6/2007 |
| JP | 2008-061220 A | 3/2008 |
| JP | 2009-044360 A | 2/2009 |

OTHER PUBLICATIONS

English translation of Written opinion for PCT Application No. PCT/JP2013/078568.
Japanese Office Action for JP Application No. 2013-012680 dated Feb. 9, 2017 with English Translation.

* cited by examiner

Fig.10B

| USER SETTING | TERMINAL POSITION | TIME ZONE | ROLE | |
|---|---|---|---|---|
| NIGHT DUTY | | | NIGHT DUTY | (1) |
| | IN NIGHT DUTY ROOM | PM9:00~AM6:00 | | |
| | | AM9:00~PM6:00 | DAYTIME DUTY | (2) |
| EMERGENCY RESPONSE | | | EMERGENCY RESPONSE | (3) |
| CHARGE OF 2F | | | CHARGE OF 2F | (4) |
| | 2F | AM9:00~PM6:00 | | |
| | | PM9:00~AM6:00 | EMERGENCY RESPONSE | |
| CHARGE OF 3F | | | CHARGE OF 3F | (5) |
| | 3F | | | |
| ⋮ | | | | |

Fig.11B

| ROLE | ROLE SPECIFICATION STANDARD | ROLE NUMBER | REGISTERED FLAG |
|---|---|---|---|
| NIGHT DUTY | WIRELESS LAN BASE STATION ID = AA OR CHARGER ID = ZZ PM9:00~AM6:00 | 9111 | REGISTERED |
| | | 9112 | UNREGISTERED |
| | | 9113 | REGISTERED |
| DAYTIME DUTY | WIRELESS LAN BASE STATION ID = AA OR CHARGER ID = ZZ AM9:00~PM6:00 | 9511 | REGISTERED |
| | | 9512 | UNREGISTERED |
| | | 9513 | REGISTERED |
| EMERGENCY RESPONSE | WIRELESS LAN BASE STATION ID = AB OR CHARGER ID = ZY | 8011 | REGISTERED |
| | | 8012 | UNREGISTERED |
| CHARGE OF 2F | WIRELESS LAN BASE STATION ID = AC OR CHARGER ID = X2 | 2201 | REGISTERED |
| | | 2202 | REGISTERED |
| CHARGE OF 3F | WIRELESS LAN BASE STATION ID = AD OR CHARGER ID = X3 | 3301 | UNREGISTERED |
| | | 3302 | UNREGISTERED |
| | | 3303 | UNREGISTERED |

Fig.20

TERMINAL ASSIGNMENT NUMBER DATABASE

| USER ID | USER NUMBER |
|---|---|
| A0001 | 2222 |
| A0005 | 2223 |
| A0090 | 3432 |
| B0002 | 6765 |
| B0080 | 6873 |
| A0111 | 2252 |
| B0984 | 7765 |

| ROLE | ROLE SPECIFICATION STANDARD | ROLE NUMBER |
|---|---|---|
| NIGHT DUTY | WIRELESS LAN BASE STATION ID = AA OR CHARGER ID = ZZ PM9:00~AM6:00 | 9111 |
| DAYTIME DUTY | WIRELESS LAN BASE STATION ID = AA OR CHARGER ID = ZZ AM9:00~PM6:00 | 9511 |
| EMERGENCY RESPONSE | WIRELESS LAN BASE STATION ID = AB OR CHARGER ID = ZY | 8011 |
| CHARGE OF 2F | WIRELESS LAN BASE STATION ID = AC OR CHARGER ID = X2 | 2201 |
| CHARGE OF 3F | WIRELESS LAN BASE STATION ID = AD OR CHARGER ID = X3 | 3301 |

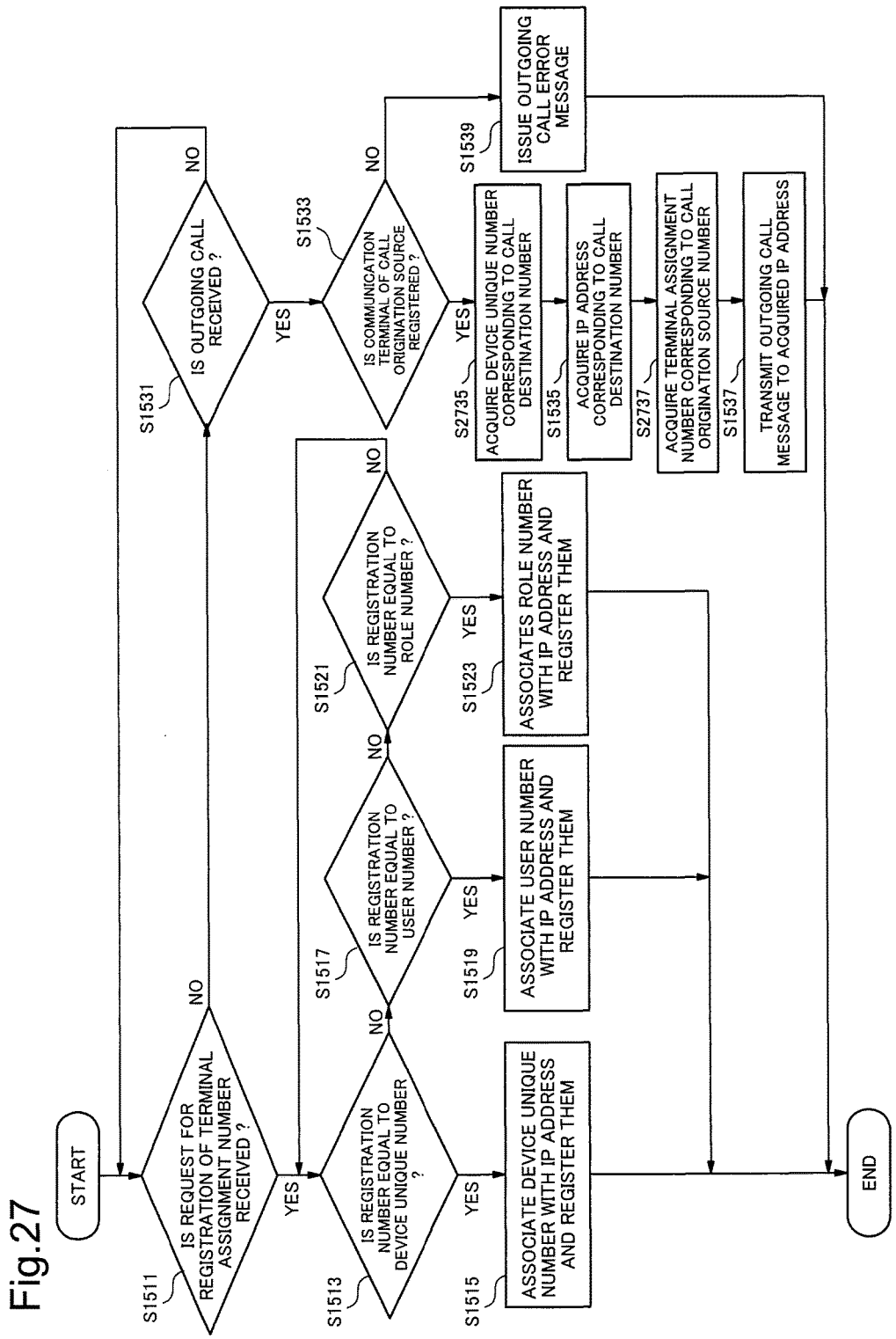

COMMUNICATION PROCESSING SYSTEM, COMMUNICATION PROCESSING METHOD, COMMUNICATION PROCESSING DEVICE, COMMUNICATION TERMINAL, AND CONTROL METHOD AND CONTROL PROGRAM THEREFOR

This application is a National Stage Entry of PCT/JP2013/078568 filed on Oct. 22, 2013, which claims priority from Japanese Patent Application 2013-012680 filed on Jan. 25, 2013, the contents of all of which are incorporated herein by reference, in their entirety.

TECHNICAL FIELD

The present invention relates to a technology in which a plurality of users use one communication terminal for communication.

BACKGROUND ART

In the above-mentioned technical field, in patent literature 1, there is a technology in which on the basis of a user ID inputted at the time of the login to an IP telephone, a telephone number assigned to the user by a management database is associated with an IP address and both data are registered, the telephone number is set to the IP telephone, and whereby, the user can change the telephone number of the IP telephone and user input information and perform voice communication.

CITATION LIST

Patent Literature

Patent literature 1: Japanese Patent Application Laid-Open No. 2007-142621

SUMMARY OF INVENTION

Technical Problem

However, in the technology described in the above-mentioned literature, the user can perform communication by the IP telephone when the user is logged in. On the other hand, the user cannot perform communication when the user is logged out. In other words, the IP telephone can operate in only two states: a user registration state in which the user can perform communication by the IP telephone and a user non-registration state in which the user cannot perform communication. Accordingly, when the IP telephone is in the user non-registration state or the like in which the user is not identified, the user cannot perform communication.

An object of the present invention is to provide a technology in which the above-mentioned problem can be solved.

Solution to Problem

In order to achieve the above-mentioned object, a communication processing system according to the present invention includes
a communication terminal,
storage means which is provided in the communication terminal or outside the communication terminal and store information about correspondence relation between user information of the communication terminal and a user number and a role number of the communication terminal, and
outgoing call relay means which relays an outgoing call from a call origination source communication terminal to the communication terminal corresponding to the user number when the communication terminal is used in a business mode in which the user is identified and relay the outgoing call from the call origination source communication terminal to the communication terminal corresponding to the role number when the communication terminal is used in a non-business mode in which the user is not identified.

In order to achieve the above-mentioned object, a communication processing method according to the present invention includes
a step in which when a call origination source communication terminal originates a call using a user number or a role number, by referring to information about correspondence relation between user information of the communication terminal and the user number and the role number of the communication terminal that are stored in storage means provided in the communication terminal or outside the communication terminal, the communication terminal corresponding to the user number is regarded as a call destination communication terminal, and the outgoing call from the call origination source communication terminal is relayed when the communication terminal is used in a business mode in which the user is identified and
a step in which the communication terminal corresponding to the role number is regarded as the call destination communication terminal and the outgoing call from the call origination source communication terminal is relayed when the communication terminal is used in a non-business mode in which the user is not identified.

In order to achieve the above-mentioned object, a communication terminal according to the present invention includes
assignment number acquisition means which acquire a user number corresponding to user information as a terminal assignment number when the communication terminal is used in a business mode in which the user is identified and acquire a role number of the communication terminal as the terminal assignment number when the communication terminal is used in a non-business mode in which the user is not identified,
assignment number registration request means which request outgoing call relay means for storing information about correspondence relation between the user number or the role number that is used by each communication terminal according to an instruction from each communication terminal and each communication terminal to register the user number or the role number that is acquired by the assignment number acquisition means, and
communication processing means which use the terminal assignment number acquired by the assignment number acquisition means as the terminal assignment number of a call origination source, use the user number acquired on the basis of user information of a call destination or the role number of the call destination as the terminal assignment number of the call destination, originate a call, and receive the call when the terminal assignment number of the call destination included in an outgoing call message is equal to the terminal assignment number acquired by the assignment number acquisition means.

In order to achieve the above-mentioned object, a method for controlling a communication terminal according to the present invention includes an assignment number acquisition step in which a user number corresponding to user information is acquired as a terminal assignment number when the communication terminal is used in a business mode in which the user is identified and a role number of the communication terminal is acquired as the terminal assignment number when the communication terminal is used in a non-business mode in which the user is not identified, an assignment number registration request step in which outgoing call relay means for storing information about correspondence relation between the user number or the role number that is used by each communication terminal according to an instruction from each communication terminal and each communication terminal is requested to register the user number or the role number that is acquired in the assignment number acquisition step, and a communication processing step in which the terminal assignment number acquired in the assignment number acquisition step is used as the terminal assignment number of a call origination source, the user number acquired on the basis of user information of a call destination or the role number of the call destination is used as the terminal assignment number of the call destination, a call is originated, and the call is received when the terminal assignment number of the call destination included in an outgoing call message is equal to the terminal assignment number acquired in the assignment number acquisition step.

In order to achieve the above-mentioned object, a program for controlling a communication terminal according to the present invention which causes a computer to perform processes of:

an assignment number acquisition step in which a user number corresponding to user information is acquired as a terminal assignment number when the communication terminal is used in a business mode in which the user is identified and a role number of the communication terminal is acquired as the terminal assignment number when the communication terminal is used in a non-business mode in which the user is not identified, an assignment number registration request step in which outgoing call relay means for storing information about correspondence relation between the user number or the role number that is used by each communication terminal according to an instruction from each communication terminal and each communication terminal is requested to register the user number or the role number that is acquired in the assignment number acquisition step, and a communication processing step in which the terminal assignment number acquired in the assignment number acquisition step is used as the terminal assignment number of a call origination source, the user number acquired on the basis of user information of a call destination or the role number of the call destination is used as the terminal assignment number of the call destination, a call is originated, and the call is received when the terminal assignment number of the call destination included in an outgoing call message is equal to the terminal assignment number acquired in the assignment number acquisition step.

In order to achieve the above-mentioned object, a communication processing device according to the present invention includes registration means which use a user number corresponding to user information or a role number of a communication terminal as a terminal assignment number, associate the terminal assignment number with each communication terminal, and register them and relay control means which regard the communication terminal corresponding to the terminal assignment number registered on the registration means as a call destination and relay the outgoing call when the terminal assignment number of the call destination included in the outgoing call from the communication terminal is registered on the registration means.

In order to achieve the above-mentioned object, a method for controlling a communication processing device according to the present invention includes registration step in which a user number corresponding to user information or a role number of a communication terminal is used as a terminal assignment number, the terminal assignment number is associated with each communication terminal, and both data are registered on registration means and relay control step in which the communication terminal corresponding to the terminal assignment number registered on the registration means is regarded as a call destination and the outgoing call is relayed when the terminal assignment number of the call destination included in the outgoing call from the communication terminal is registered on the registration means.

In order to achieve the above-mentioned object, a program for controlling a communication processing device according to the present invention causes a computer to perform processes of:

registration step in which a user number corresponding to user information or a role number of a communication terminal is used as a terminal assignment number, the terminal assignment number is associated with each communication terminal, and both data are registered on registration means and relay control step in which communication terminal corresponding to the terminal assignment number registered on the registration means is regarded as a call destination and the outgoing call is relayed when the terminal assignment number of the call destination included in the outgoing call from the communication terminal is registered on the registration means.

Advantageous Effects of Invention

According to the present invention, a communication terminal can effectively be made communicable even in a non-business mode in which the user is not identified.

BRIEF DESCRIPTION OF DRAWINGS

FIG. 10B is a figure showing a structure of a role determination table according to a second exemplary embodiment of the present invention.

FIG. 11B is a figure showing a structure of a role number database according to a second exemplary embodiment of the present invention.

FIG. 20 shows a structure of a terminal assignment number database according to a third exemplary embodiment of the present invention.

FIG. 27 is a flowchart showing a processing procedure of a private exchange server according to a fifth exemplary embodiment of the present invention.

DESCRIPTION OF EMBODIMENTS

Figure 1:
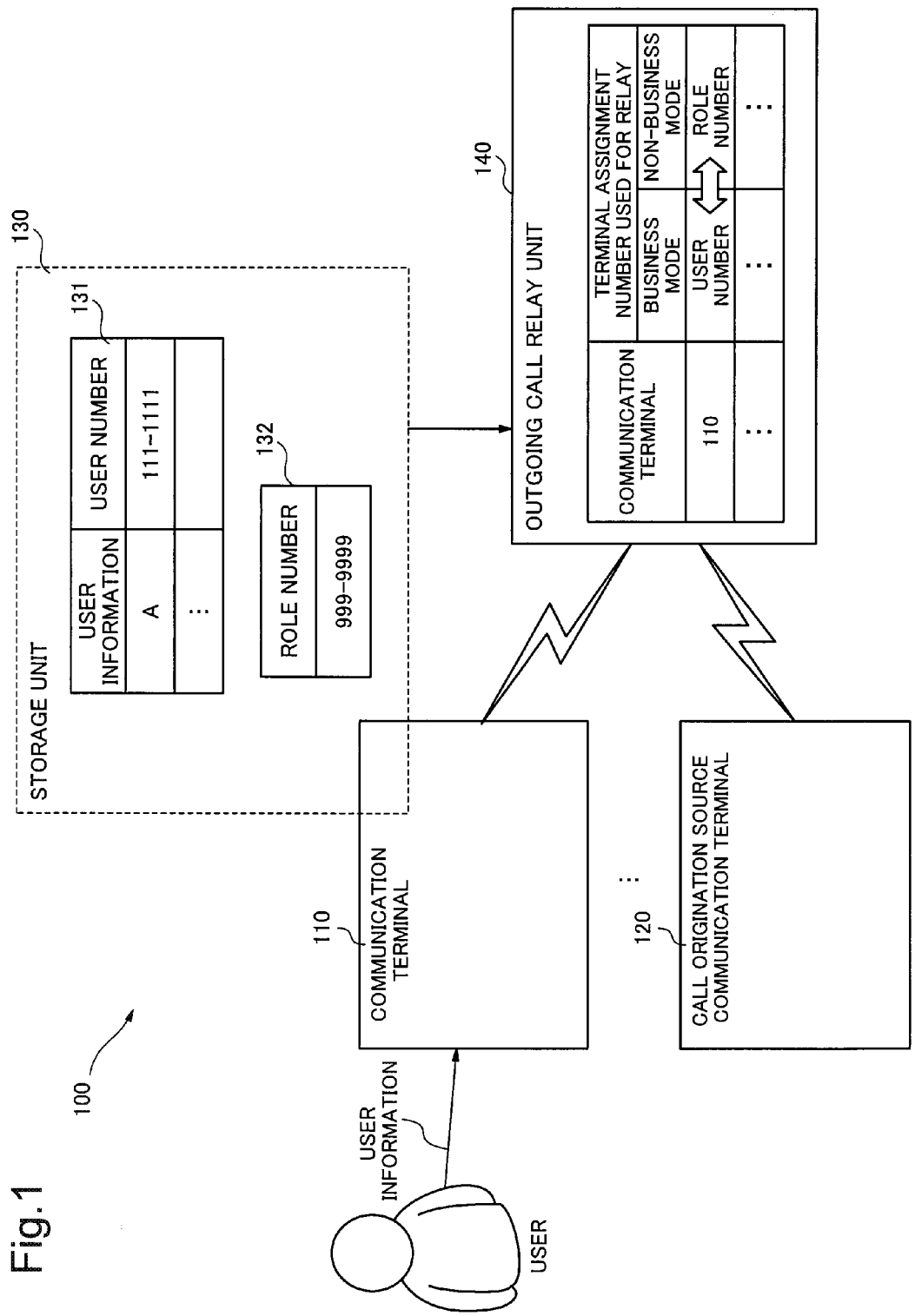
FIG. 1 is a block diagram showing a configuration of a communication processing system according to a first exemplary embodiment of the present invention.

An exemplary embodiment of the present invention will be exemplarily described in detail below with reference to the drawing. However, the component described in the following exemplary embodiment is shown as an example. Therefore, the technical scope of the present invention is not limited to the described exemplary embodiment.

First Exemplary Embodiment

A communication processing system 100 according to a first exemplary embodiment of the present invention will be described by using FIG. 1. The communication processing system 100 is a system in which a communication terminal is used for business.

As shown in FIG. 1, the communication processing system 100 includes a communication terminal 110, a call origination source communication terminal 120, a storage unit 130, and an outgoing call relay unit 140.

The storage unit 130 is provided in the communication terminal 110 or outside the communication terminal 110. The storage unit 130 stores information (131) about correspondence relation between user information of the communication terminal 110 and a user number and a role number (132) of the communication terminal 110.

When the communication terminal 110 is used in a business mode in which a user is identified, the outgoing call relay unit 140 relays the outgoing call from the call origination source communication terminal 120 to the communication terminal corresponding to the user number. When the communication terminal 110 is used in a non-business mode in which the user is not identified, the outgoing call relay unit 140 relays the outgoing call from the call origination source communication terminal 120 to the communication terminal corresponding to the role number.

By using this exemplary embodiment, even when the communication terminal is used in the non-business mode in which the user is not identified, the role number of the communication terminal can be used as the terminal assignment number for outgoing call. Therefore, the communication terminal can be made communicable effectively even in the non-business mode.

Second Exemplary Embodiment

Next, an information processing system according to a second exemplary embodiment of the present invention will be described by using FIG. 2 to FIG. 16. In this exemplary embodiment, when a user is logged in to a business server from a communication terminal, the communication terminal uses the user number corresponding to user information as a terminal assignment number (so-called telephone number) in the business mode. On the other hand, when the user is logged out of the business server by the communication terminal, the communication terminal uses the role number corresponding to the role information as the terminal assignment number in the non-business mode. Further, in the exemplary embodiment, the user number and the role number are assigned by the terminal assignment number server provided outside the communication terminal. Further, in the following exemplary embodiment, a case in which the role number corresponding to the role information is assigned will be explained as an example. However, when the communication terminal has only one fixed role (for example, when a user is not logged in, the communication terminal is used as a shared telephone), it is not necessary to associate the role information with the role number and store them.

In addition to the effect of the first exemplary embodiment, according to this exemplary embodiment, an effect in which the registration or deletion of the user, the change of the role number, or the like can be performed by only changing data in the server with simple operation can be obtained because it is not necessary to assign the user number and the role number to the communication terminal in advance.

<<Communication Processing System>>

A communication processing system according to this exemplary embodiment will be described with reference to FIG. 2 to FIG. 6.

(Summary of Operation)

Figure 2:
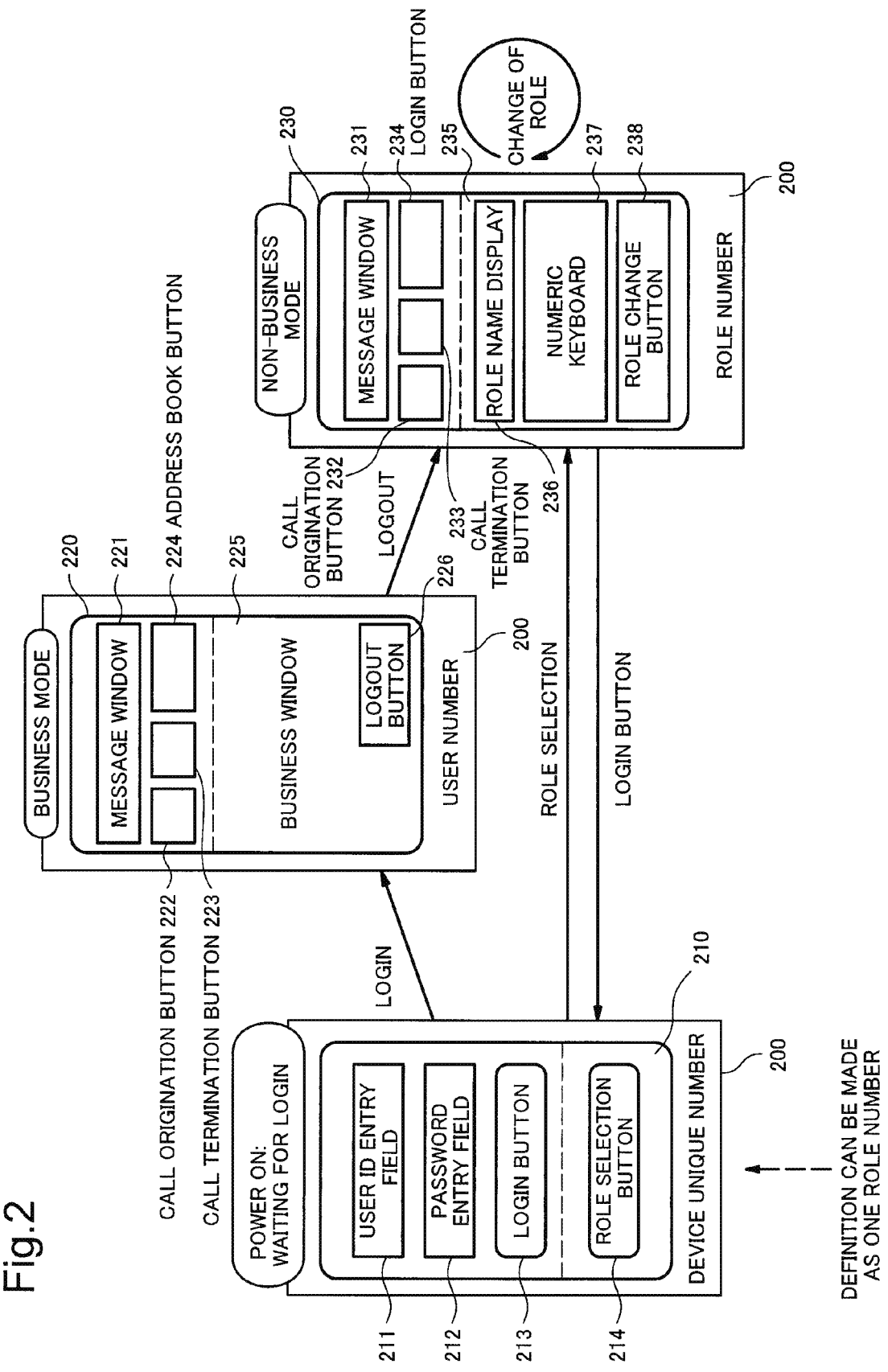
FIG. 2 is a state transition diagram of a communication terminal in a communication processing system according to a second exemplary embodiment of the present invention.

FIG. 2 is a state transition diagram of a communication terminal 200 in a communication processing system according to the exemplary embodiment. Further, in the following explanation using FIG. 2, the communication terminal 200 is a portable terminal such as a smart phone or the like. However, the communication terminal 200 may be a portable terminal such as a portable telephone, a smart phone, or the like, a laptop PC (Personal Computer), a desktop PC, or the like.

In FIG. 2, when a power switch of the communication terminal 200 is turned on and the communication terminal 200 is in a login wait state, the communication terminal 200 displays a login wait screen 210. In the login wait screen 210, a user ID entry field 211, a password entry field 212, a login button 213, and a role selection button 214 are displayed. When a user enters a user ID in the user ID entry field 211 as a user identifier, enters a password in the password entry field 212, and then presses the login button 213, an authentication server performs user authentication. As a result of the user authentication, when the user is logged in, the mode of the communication terminal 200 is changed to the business mode and the communication terminal 200 is allowed to access to the business server. As a result, the communication terminal 200 displays a business mode screen 220. On the other hand, when the role selection button 214 is pressed, the mode of the communication terminal 200 is changed to the non-business mode and the communication terminal 200 displays a non-business mode screen 230.

In the business mode screen 220, a message window 221, a call origination button 222, a call termination button 223, an address book button 224, a window 225 for business, and a logout button 226 are displayed. In the business mode, a communication terminal is connected to the business server and various businesses data are entered to the business server by using the window 225 for business. Further, an instruction from the business server is received. Further, the business to which the exemplary embodiment is applied is not limited. The communication terminal 200 displays the message window 221 in which a user's message that is transmitted to/received from another communication terminal is displayed, the call origination button 222 for originating a call to another communication terminal, the call termination button 223 for receiving the call from the another communication terminal, and the address book button 224 for displaying the address book of the communication terminal in addition to the window 225 for business in the business mode screen 220. The communication terminal 200 displays the logout button 226 used when the user is logged out of the business mode in the business mode screen 220. When the logout button 226 is pressed, the mode of the communication terminal 200 is changed to the non-business mode, the connection with the business server is released, and the communication terminal 200 displays the non-business mode screen 230.

In the non-business mode screen 230, a message window 231, a call origination button 232, a call termination button 233, a login button 234, and a window 235 for role are displayed. In the window 235 for role, a role name display field 236, a numeric keyboard 237, and a role change button 238 are displayed. During a period in which the mode is changed to the non-business mode, the role of the communication terminal 200 is determined on the basis of a current position of the communication terminal 200, time, and the like. The communication terminal 200 displays the determined role name in the role name display field 236 of the non-business mode screen 230 and also displays the role change button 238 for changing the role and the numeric keyboard 237 for inputting the role number after change. The communication terminal 200 displays the message window 231 in which a user's message that is transmitted to/received from another communication terminal is displayed, the call origination button 232 for originating a call to another communication terminal, and the call termination button 233 for receiving the call from the another communication terminal in addition to the window 235 for role in the non-business mode screen 230. Further, the communication terminal 200 displays the login button 234 for changing the screen from the non-business mode screen to a login wait screen. When the login button 234 is pressed, the mode of the communication terminal 200 is changed to the login wait mode and displays the login wait screen 210.

(System Configuration)

Figure 3:
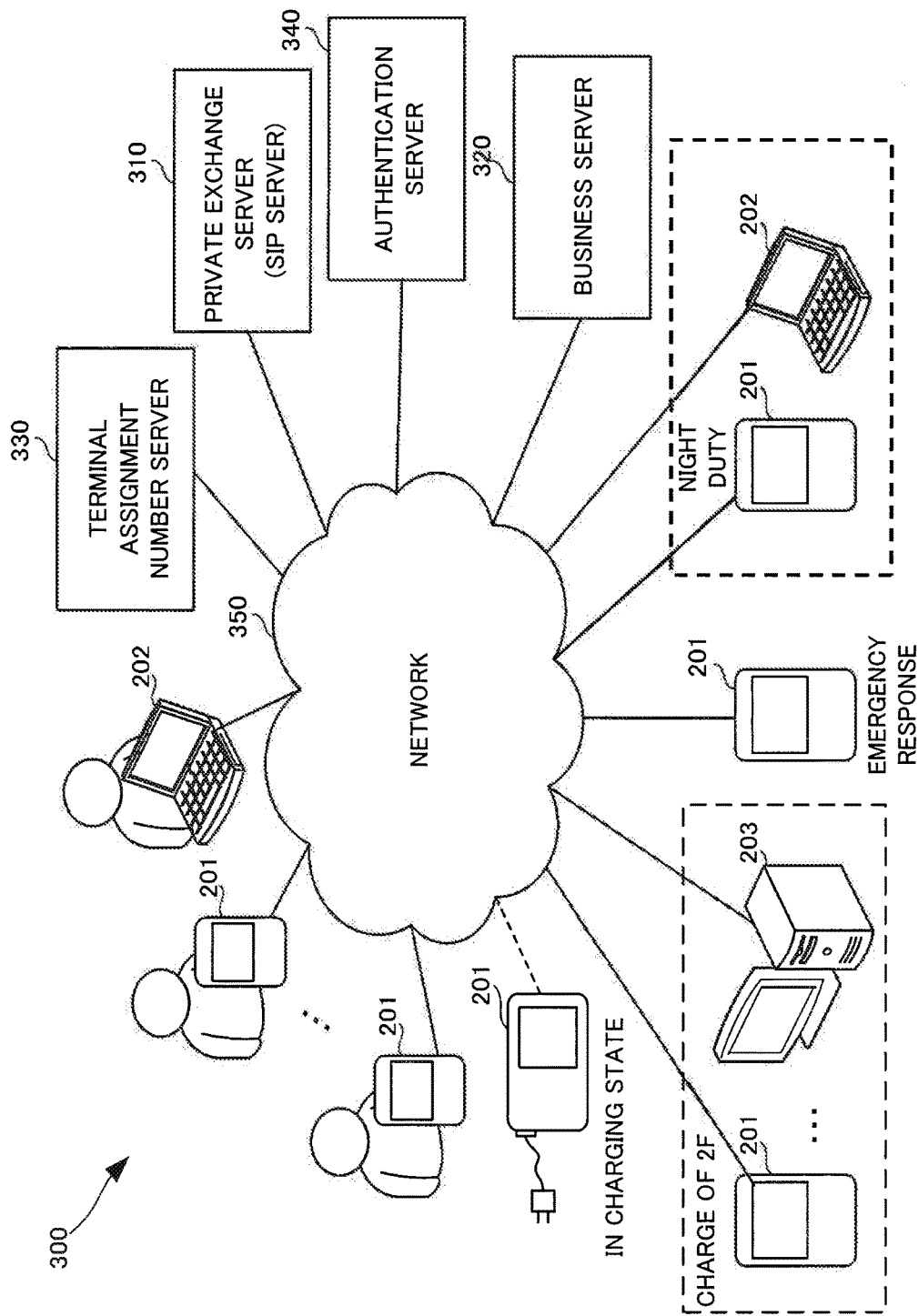
FIG. 3 is a block diagram showing a configuration of a communication processing system according to a second exemplary embodiment of the present invention.

FIG. 3 is a block diagram showing a configuration of a communication processing system 300 according to this exemplary embodiment.

In the communication processing system 300 shown in FIG. 3, a plurality of communication terminals are connected to the server which controls the operation of the communication terminal and provides information via a network 350. As a plurality of the communication terminals, a portable terminal 201 such as a portable telephone, a smart phone, or the like, a laptop PC 202, and a desktop PC 203 are shown in FIG. 3. As the server, a private exchange server (for example, a SIP server) 310, a business server 320, a terminal assignment number server 330, and an authentication server 340 are included. The private exchange server 310 controls the connection between the communication terminals 200. The business server 320 is connected to the communication terminal 200 during login and provides a business service. The terminal assignment number server 330 assigns the user number used during login and the role number used during logout to the communication terminal 200. The authentication server 340 authenticates the communication terminal 200 and a user that uses the communication terminal 200.

The communication terminal 200 has various states: a state in which the communication terminal is carried by a user and a user is logged in, a state in which the communication terminal is being charged, a state in which a user carrying the communication terminal is in charge of 2F as the role, a state in which a user is in charge of emergency response as the role, a state in which a user is in charge of night duty as the role, and the like. Different number is assigned to each state by the terminal assignment number server 330. The communication terminal 200 performs message communication (including a voice communication) between the communication terminals by using the assigned number. Further, the role is not limited to the roles shown in FIG. 3.

(Registration Process for Terminal Assignment Number)

Figure 4:
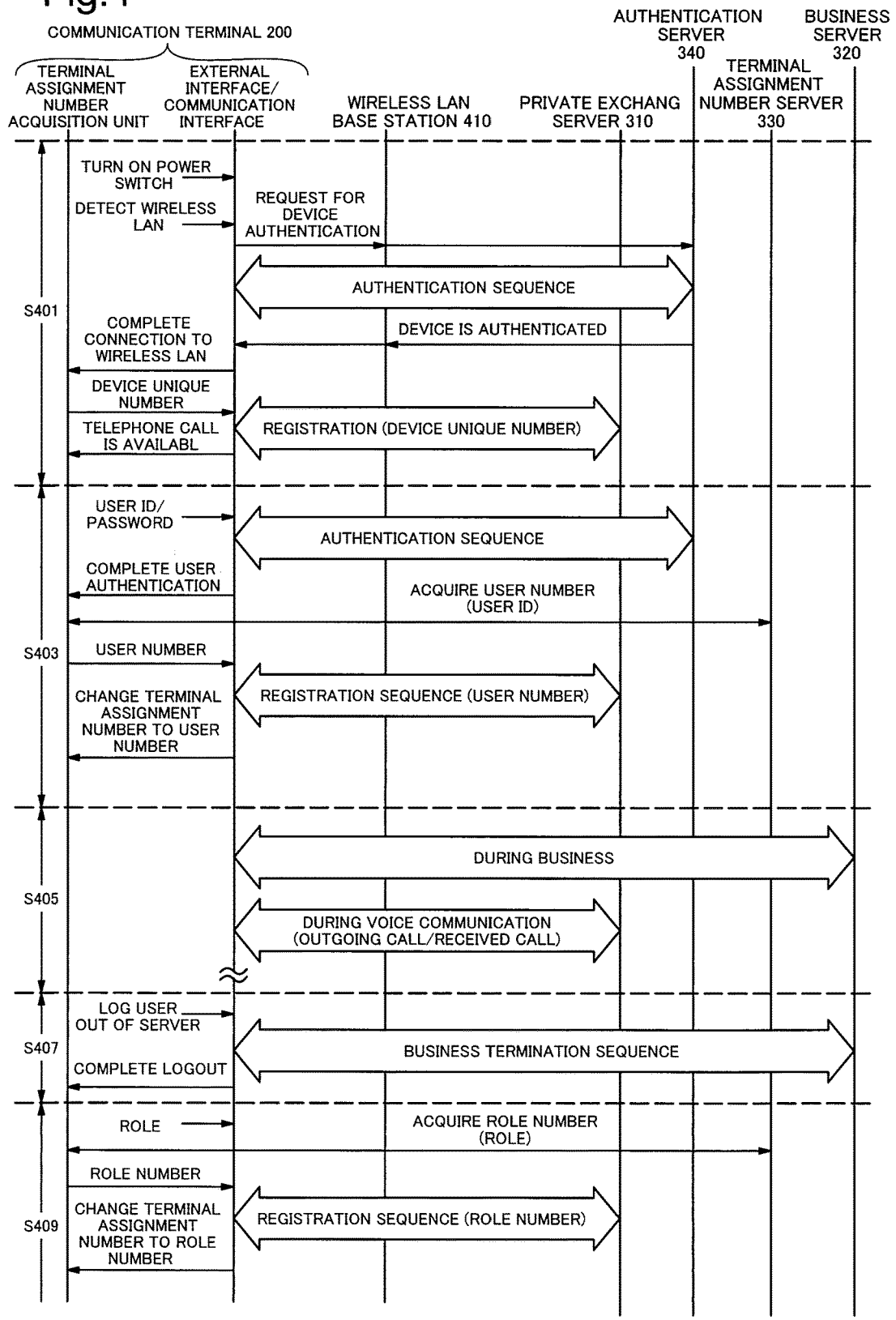
FIG. 4 is a sequence diagram showing a procedure of a process for registering a terminal assignment number by a communication terminal in a communication processing system according to a second exemplary embodiment of the present invention.

FIG. 4 is a sequence diagram showing a procedure of a process of registering the terminal assignment number by the communication terminal 200 in the communication processing system 300 according to the exemplary embodiment. Further, in this exemplary embodiment, it is assumed that the terminal assignment number acquisition unit of the communication terminal 200 acquires a device unique number from its own communication terminal and acquires the terminal assignment number of its own communication terminal in the business mode and the non-business mode from the terminal assignment number server 330 provided outside the communication terminal 200.

The sequence shown in FIG. 4 includes a step (S401) of registering the communication terminal 200, a step (S403) of performing a login process, a step (S405) of operating the communication terminal 200 in the business mode, a step (S407) of performing a logout process, and a step (S409) of assigning the role to the communication terminal in the non-business mode. Further, the processes of steps S401 to S409 in the sequence are not necessarily performed in the order shown in FIG. 4. For example, when the role selection button 214 is pressed in the login wait screen 210 shown in FIG. 2, the process proceeds to step S409 from step S401.

In step S401, when the power switch of the communication terminal 200 is turned on and a wireless LAN (for example, an access point in a room) is detected, the communication terminal 200 requests the authentication server 340 to authenticate the communication terminal via a wireless LAN base station 410. When a notification indicating that the communication terminal is authenticated on the basis of the authentication sequence is received, the terminal assignment number acquisition unit acquires the device unique number of its own terminal and the communication terminal 200 associates it with the IP address of the communication terminal 200 and registers them on the private exchange server 310. Whereby, voice communication using the communication terminal 200 becomes available. When the communication terminal 200 is in this state, the communication terminal 200 displays the login wait screen 210 shown in FIG. 2.

In step S403, when the user enters the user ID and the password and is logged in, first, the user authentication is performed by the authentication server 340. When the user is authenticated, the terminal assignment number acquisition unit of the communication terminal 200 requests the terminal assignment number server 330 to assign the user number corresponding to the user ID and acquires it. The communication terminal 200 registers the acquired user number on the private exchange server 310. When the private exchange server 310 associates the device unique number registered in step 401, the IP address, and the user number with each other and registers them, it transmits a notification of user number registration completion to the communication terminal 200. When the communication terminal 200 receives the notification of user number registration completion, it changes the terminal assignment number that is the device unique number to the user number. After this change, the communication terminal 200 transmits and receives a message (originates and receives a call) by using the user number. The display screen of the communication terminal 200 is changed to the business mode screen 220 shown in FIG. 2.

In step S405, the user can operate the communication terminal 200 through the business mode screen 220 shown in FIG. 2. In step S405, the communication terminal 200 receives the business service by communicating with the business server 320 and performs message transmission and a voice communication with another communication terminal via the private exchange server 310 by using the user number.

In step S407, when the user is logged out, the communication terminal 200 is disconnected from the business server 320 according to a business termination sequence. The mode of the communication terminal 200 is changed to the non-business mode shown in FIG. 2.

In step S409, the communication terminal 200 determines the role of the communication terminal 200 on the basis of a user's input, the current position of the communication terminal 200, time, and the like. The terminal assignment number acquisition unit of the communication terminal 200 requests the terminal assignment number server 330 to assign the role number corresponding to the role and acquires it. The communication terminal 200 registers the acquired role number on the private exchange server 310. When the private exchange server 310 associates the device unique number registered in step S401, the IP address, and the role number with each other, registers them, and transmits a notification of role number registration completion to the communication terminal 200. When the communication terminal 200 receives the notification of role number registration completion, it changes the terminal assignment number that is the user number to the role number. After this change, the communication terminal 200 transmits and receives a message (originates and receives a call) by using the role number. The display screen of the communication terminal 200 is changed to the non-business mode screen 230 shown in FIG. 2. Further, when the role selection button 214 is pressed in the login wait screen 210 shown in FIG. 2, the terminal assignment number that is the device unique number is changed to the role number. After this change, the communication terminal 200 transmits and receives a message (originates and receives a call) by using the role number. The display screen of the communication terminal 200 is changed to the non-business mode screen 230 shown in FIG. 2.

In FIG. 4, the communication terminal 200 determines the role and requests the terminal assignment number server 330 to assign the role number corresponding to the role. However, a method in which the communication terminal 200 transmits information such as the current position, time, and the like to the terminal assignment number server 330 and the terminal assignment number server 330 determines the role on the basis of the received information and assigns the role number corresponding to the role may be used. Further, the role may be identified by an ID of the wireless LAN base station (AP: Access Point) connected to the communication terminal 200, an ID of the charger used for charging the communication terminal 200, or the like. In FIG. 4, the role determination on the basis of the wireless LAN base station ID, the charger ID, or the like is not shown because the figure becomes complicated.

(Voice Communication Process Between Communication Terminals)

Figure 5:
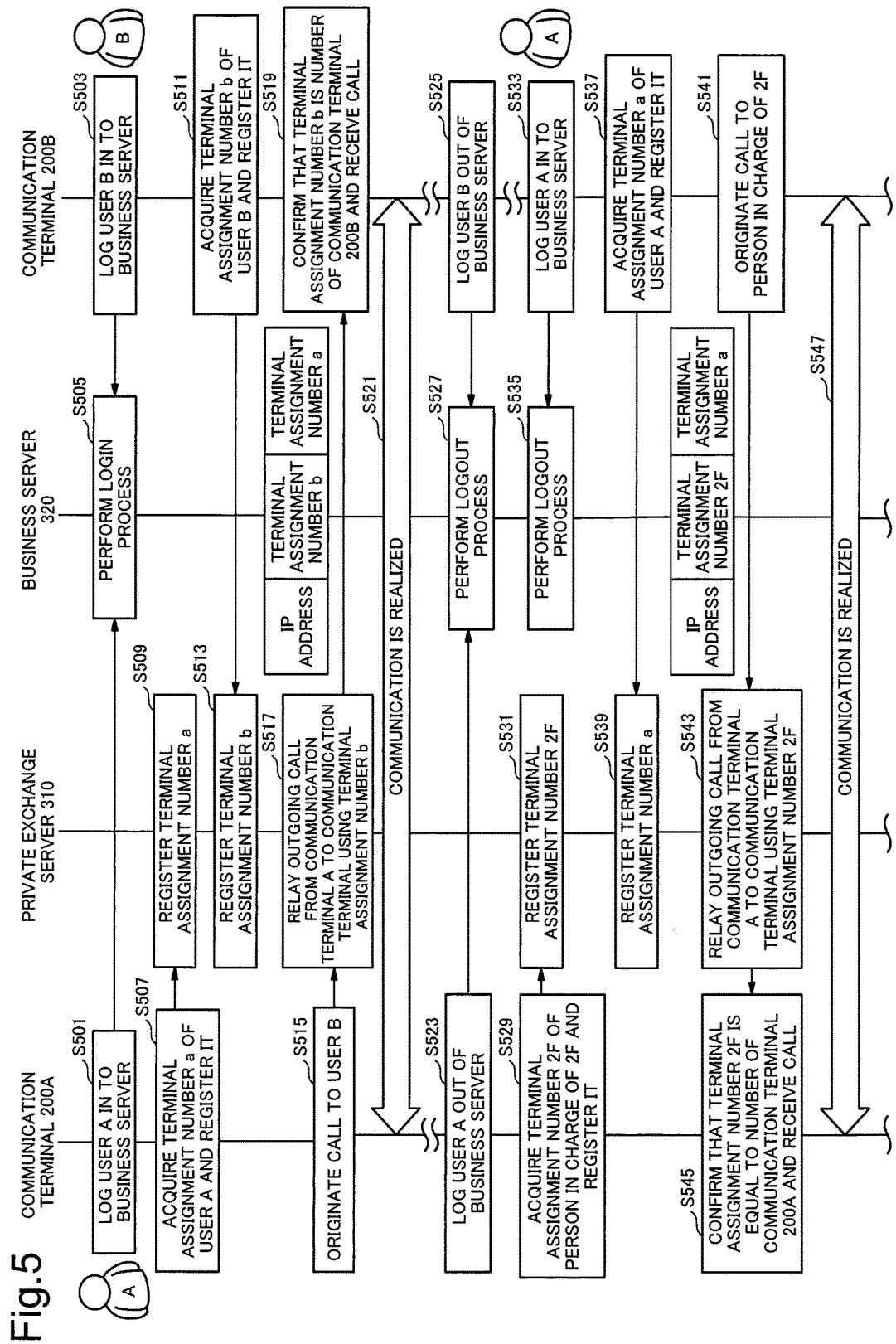
FIG. 5 is a sequence diagram showing a procedure of a voice communication process between communication terminals in a communication processing system according to a second exemplary embodiment of the present invention.

FIG. 5 is a sequence diagram showing a procedure of a voice communication process between a communication terminal 200A and a communication terminal 200B in the communication processing system 300 according to the exemplary embodiment. In FIG. 5, a case in which first, a user A of the communication terminal 200A is logged in to the business server 320 and a user B of the communication terminal 200B is logged in to the business server 320, the communication terminal 200A originates a call to the communication terminal 200B, and a voice communication between them is performed is shown. Next, a case in which the user A and the user B are logged out, the user A is logged in to the business server 320 by the communication terminal 200B, the communication terminal 200B originates a call to the communication terminal 200A which is in a logout state and is in charge of 2F as the role, and the voice communication is performed is shown. Further, in FIG. 5, a detailed procedure of authentication, assignment of the number, and registration of the number is not shown.

In step S501, the user A is logged in to the business server 320 by the communication terminal 200A and in step S503, the user B is logged in to the business server 320 by the communication terminal 200B. In step S505, the business server 320 performs the login process. In step S507, the communication terminal 200A acquires a terminal assignment number a corresponding to the user A and requests the private exchange server 310 to register it. In step S509, the private exchange server 310 registers the terminal assignment number a as the terminal assignment number of the communication terminal 200A. On the other hand, in step S511, the communication terminal 200B acquires a terminal assignment number b corresponding to the user B and requests the private exchange server 310 to register it. In step S513, the private exchange server 310 registers the terminal assignment number b as the terminal assignment number of the communication terminal 200B.

In step S515, the user A originates a call to the user B by the communication terminal 200A. Actually, the communication terminal 200A originates a call to the terminal using the terminal assignment number b corresponding to the user B. In step S517, the private exchange server 310 relays the outgoing call from the communication terminal A to the communication terminal using the terminal assignment number b to the communication terminal with the IP address corresponding to the terminal assignment number b that is the transmission destination number. In step S519, the communication terminal 200B determines whether or not the terminal assignment number b included in the message received from the private exchange server 310 is the number of the communication terminal 200B and when the communication terminal 200B confirms that the terminal assignment number b is equal to the number of the communication terminal 200B, it receives the call originated by the communication terminal 200A. In step S521, the voice communication between the user A and the user B is realized by using the communication terminal 200A and the communication terminal 200B.

Next, in step S523, the user A using the communication terminal 200A is logged out and in step S525, the user B using the communication terminal 200B is logged out. In step S275, the business server 320 performs a logout process. The mode of the communication terminal 200A is changed to the non-business mode shown in FIG. 2 when the logout process is performed. In step S529, for example, the communication terminal 200A acquires a terminal assignment number 2F of a person that is in charge of 2F as the role on the basis of the user setting or the current position of the communication terminal 200A. The communication terminal 200A requests the private exchange server 310 to register the terminal assignment number 2F. In step S531, the private exchange server 310 registers the terminal assignment number 2F of the communication terminal 200A. Further, after the user of the communication terminal 200B is logged out, the role number is assigned to the communication terminal 200B. However, this operation is not shown in FIG. 5 and the description is omitted because it becomes complicated.

In step S533, the user A is logged in to the business server 320 by the communication terminal 200B. In step S535, the business server 320 performs the login process. In step S537, the communication terminal 200B acquires the terminal assignment number a corresponding to the user A and requests the private exchange server 310 to register it. In step S539, the private exchange server 310 registers the terminal assignment number a as the terminal assignment number of the communication terminal 200B.

In step S541, the user A originates a call to the person in charge of 2F from the communication terminal 200B. Actually, the communication terminal 200B places a call to the terminal assignment number 2F corresponding to the person in charge of 2F. In step S543, the private exchange server 310 relays the outgoing call from the communication terminal A to the communication terminal using the terminal assignment number 2F to the communication terminal with the IP address corresponding to the terminal assignment number 2F that is the transmission destination number. In step S545, the communication terminal 200A determines whether or not the terminal assignment number 2F included in the message received from the private exchange server 310 is equal to the number of the communication terminal 200A and when the communication terminal 200A confirms that the terminal assignment number 2F is equal to the number of the communication terminal 200A, it receive the call originated by the communication terminal 200B. In step S547, the voice communication between the user A and the person in charge of 2F is realized by using the communication terminal 200A and the communication terminal 200B.

From FIG. 5, it is clear that the voice communication between various pair of the calling communication terminal and the called communication terminal can be performed by using the same communication terminal even when the user is changed or the role is changed.

(Data Format)

Figure 6:
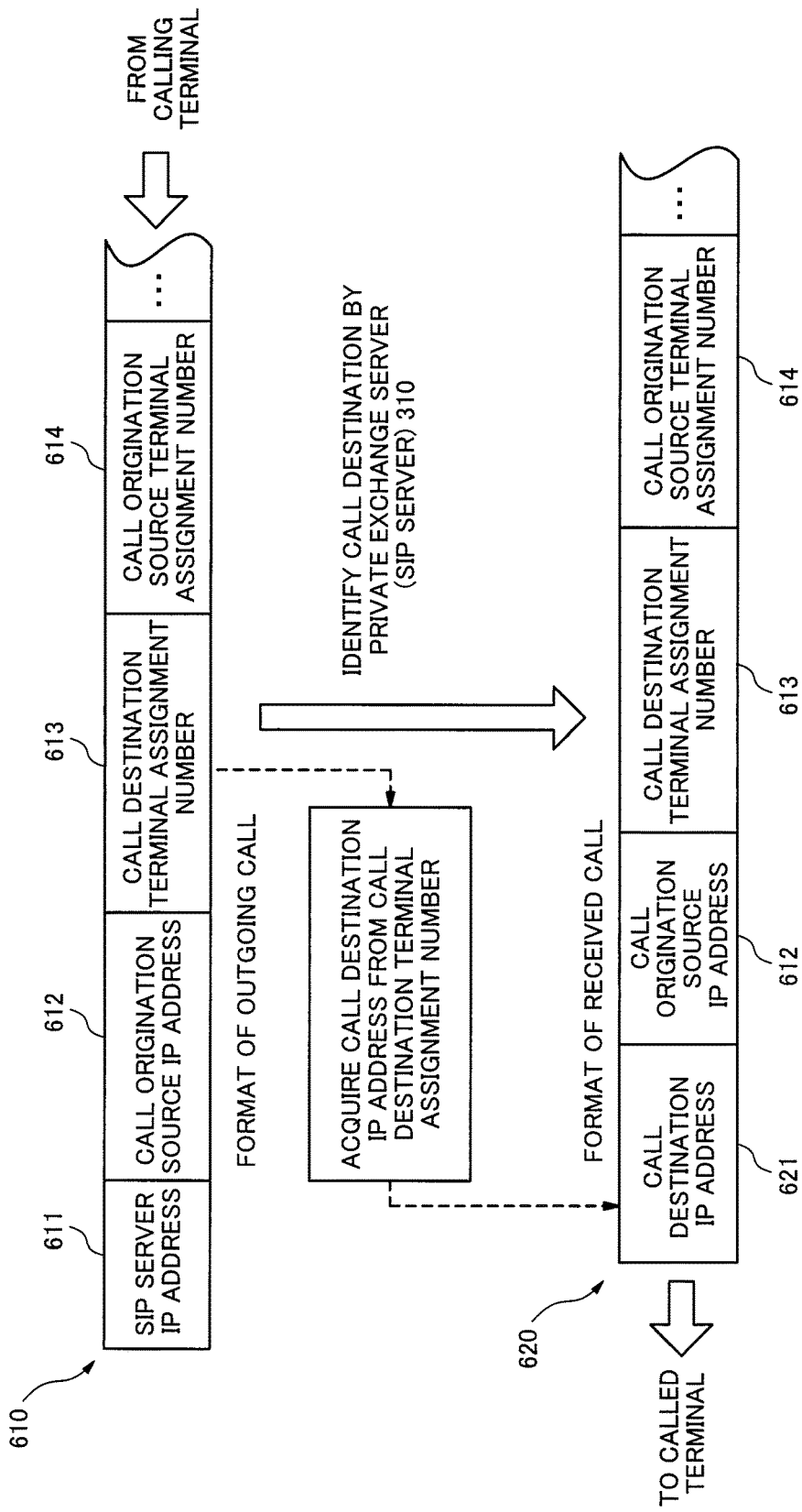
FIG. 6 is a figure showing a data format used in a voice communication process between communication terminals in a communication processing system according to a second exemplary embodiment of the present invention.

FIG. 6 is a figure showing a data format used in a voice communication process between communication terminals in the communication processing system 300 according to the exemplary embodiment. FIG. 6 shows a state in which a message format 610 transmitted from the calling terminal is converted into a message format 620 sent to the called terminal by the private exchange server 310. Further, FIG. 6 shows a simplified message format. Please refer to the standard protocol in which the detailed structure is described.

A SIP (Session Initiation Protocol) server IP address 611, a call origination source IP address 612, a call destination terminal assignment number 613 of the call destination communication terminal, and a call origination source terminal assignment number 614 of the call origination source communication terminal are included in the message format 610 transmitted from the calling terminal to the private exchange server 310. In the private exchange server 310, a call destination IP address 621 is acquired from the call destination terminal assignment number 613. The call destination IP address 621, the call origination source IP address 612, the call destination terminal assignment number 613 of the call destination communication terminal, and the call origination source terminal assignment number 614 of the call origination source communication terminal are included in the message format 620 transmitted from the private exchange server 310 to the called terminal.

Further, the private exchange server 310 determines whether or not the call origination source terminal assignment number and the call destination terminal assignment number are registered and whereby, the call is prevented from being originated by an unregistered communication terminal. The communication terminal compares the call destination terminal assignment number with the user number or the role number that is currently used by its own communication terminal and whereby, the call with wrong number can be prevented from being received.

<<Functional Configuration of Communication Terminal>>

Figure 7:
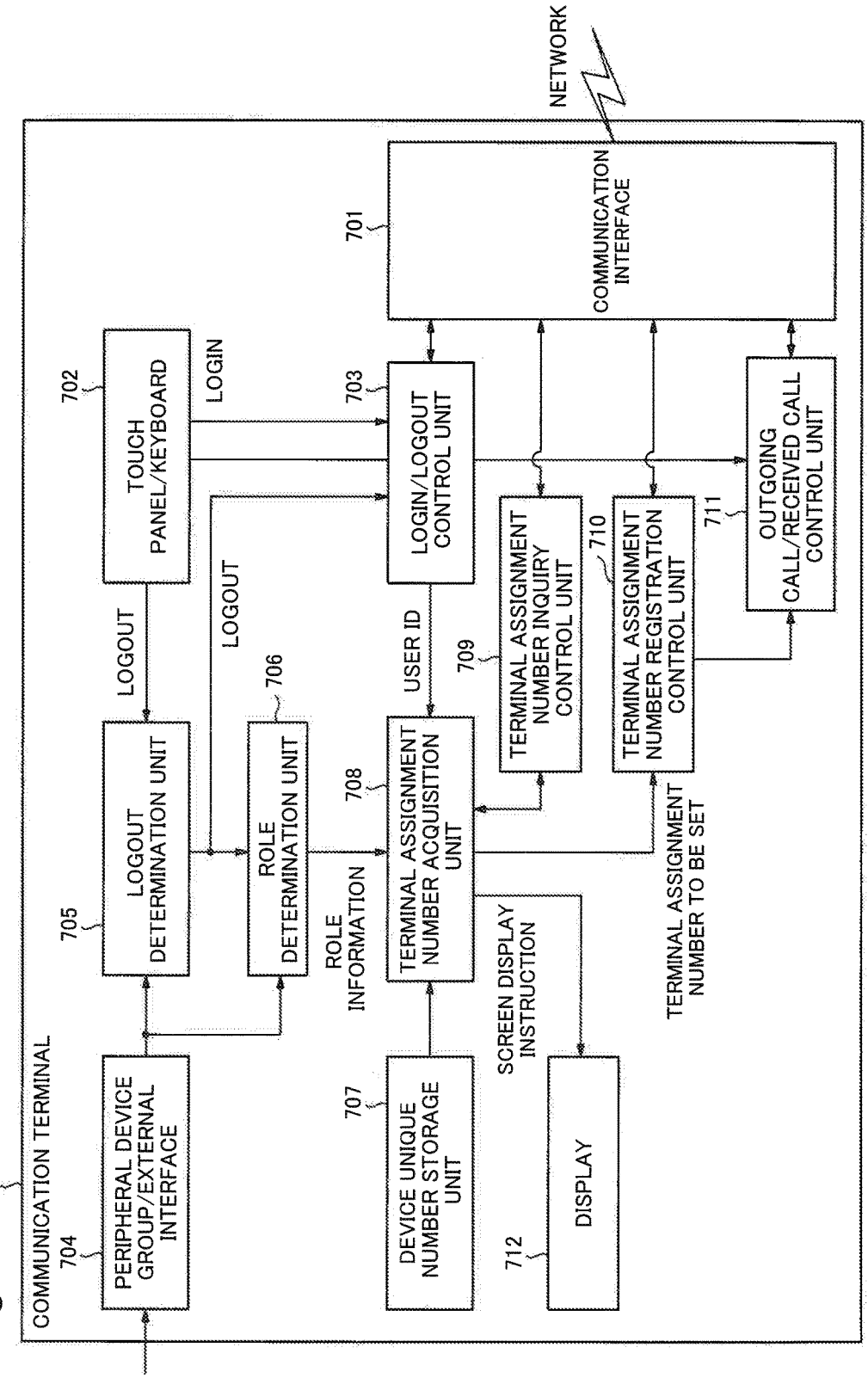
FIG. 7 is a block diagram showing a functional configuration of a communication terminal according to a second exemplary embodiment of the present invention.

FIG. 7 is a block diagram showing a functional configuration of the communication terminal 200 according to the exemplary embodiment. Further, each functional configuration unit shown in FIG. 7 may be realized by hardware individually or each functional configuration unit may be realized by executing a program stored in a memory or a storage by a CPU (Central Processing Unit). In this case, with respect to the data required for each process, for example, the data and the program that are usually used are stored in the storage and the temporary data is stored in a RAM (Random Access Memory).

A communication interface 701 is an interface through which the communication terminal 200 communicates with another communication terminal and a server via the network. A touch panel/keyboard 702 is a user interface with which the user inputs data and an instruction to the communication terminal 200. A login/logout control unit 703 controls the login to the business server 320 and the logout from the business server 320 according to the instruction inputted from the touch panel/keyboard 702. A peripheral device group/external interface 704 is an interface with a peripheral device group connected to the communication terminal 200 and includes for example, an interface with a GPS (Global Positioning System) or a vibration meter, a USB (Universal Serial Bus) interface, or the like.

A logout determination unit 705 includes a logout determination table (not shown) and determines the logout of the communication terminal 200 on the basis of the information from the touch panel/keyboard 702, the information from the peripheral device group/external interface 704, and the like. A role determination unit 706 includes a role determination table (not shown) and determines the role of the communication terminal 200 on the basis of the current position information from the peripheral device group/external interface 704 or the like. A device unique number storage unit 707 stores the terminal assignment number unique to the communication terminal.

A terminal assignment number acquisition unit 708 acquires the unique number as the terminal assignment number from the device unique number storage unit 707 when the power switch is turned on. The terminal assignment number acquisition unit 708 acquires the terminal assignment number by a terminal assignment number inquiry control unit 709 on the basis of the user ID at the time of login from the login/logout control unit 703 and the role information during logout from the role determination unit 706. A terminal assignment number registration control unit 710 holds the terminal assignment number acquired by the terminal assignment number acquisition unit 708 and registers it on the private exchange server 310 as the terminal assignment number used by the communication terminal 200.

An outgoing call/received call control unit 711 uses the terminal assignment number held by the terminal assignment number registration control unit 710 and controls the origination of a call to another communication terminal and the reception of a call from another communication terminal in response to the user instruction from the touch panel/keyboard 702. A display 712 displays the state of the communication terminal 200, the received message, a button image associated with the touch panel, and the like.

Further, when the communication terminal 200 does not determine the role, the role determination unit 706 is eliminated. When the communication terminal 200 acquires the position information or the like and transmits it to the terminal assignment number server 330, a role determination information acquisition unit is used instead of the role determination unit 706.

<<Functional Configuration of Private Exchange Server>>

Figure 8:
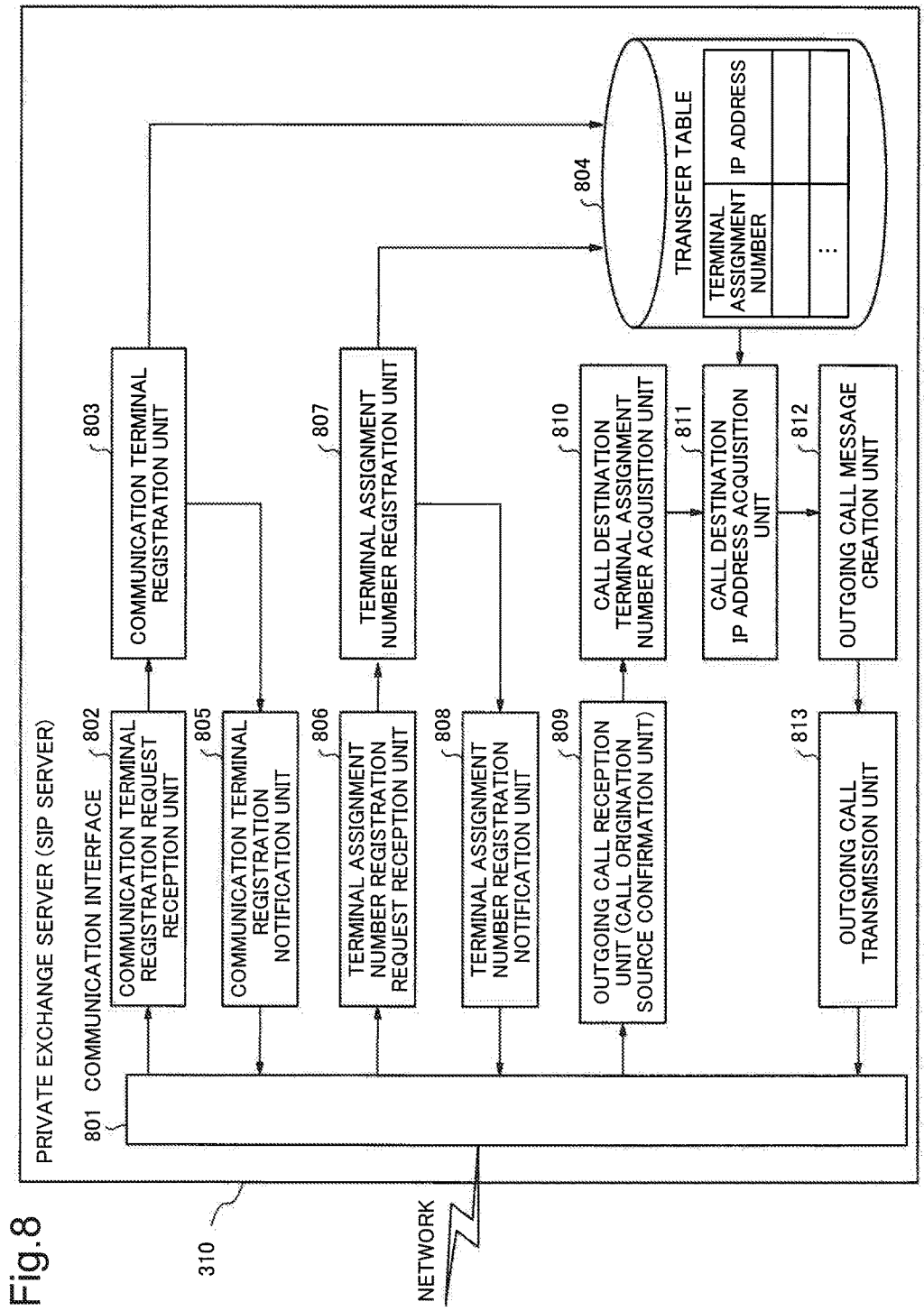
FIG. 8 is a block diagram showing a functional configuration of a private exchange server according to a second exemplary embodiment of the present invention.

FIG. 8 is a block diagram showing a functional configuration of the private exchange server 310 according to the exemplary embodiment. Further, each functional configuration unit shown in FIG. 8 may be realized by hardware individually or each functional configuration unit may be realized by executing a program stored in the memory or the storage by the CPU. In this case, with respect to the data required for each process, for example, the data, the transfer table, and the program that are usually used are stored in the storage device and the temporary data is stored in the RAM.

A communication interface 801 is an interface through which the private exchange server 310 communicates with the communication terminal 200 via the network. A communication terminal registration request reception unit 802 receives a request for the registration of the unique number at the time of turning on the power switch from the communication terminal 200. A communication terminal registration unit 803 associates the device unique number that is an initial terminal assignment number with the IP address of the communication terminal 200 and stores them in a transfer table 804. In other words, the communication terminal that is switched and controlled by the private exchange server 310 is registered. A communication terminal registration notification unit 805 notifies the communication terminal 200 of the communication terminal registration completion.

A terminal assignment number registration request reception unit 806 receives the user number from the communication terminal 200 at the time of login and receives the role number from the communication terminal 200 during logout. A terminal assignment number registration unit 807 associates the user number or the role number that is the terminal assignment number with the IP address and the device unique number of the communication terminal 200 and stores them in the transfer table 804. In other words, the terminal assignment number used by the communication terminal that is switched and controlled by the private exchange server 310 is registered. A terminal assignment number registration notification unit 808 notifies the communication terminal 200 of the user number registration completion or the role number registration completion.

An outgoing call reception unit 809 receives the outgoing call message from the communication terminal 200. The outgoing call reception unit 809 may include a call origination source confirmation unit that confirms the call origination source on the basis of whether or not the terminal assignment number of the call origination source is registered on the transfer table 804. A call destination terminal assignment number acquisition unit 810 extracts the terminal assignment number of the call destination from the outgoing call message received by the outgoing call reception unit 809. A call destination IP address acquisition unit 811 acquires the IP address of the call destination communication terminal from the transfer table 804 on the basis of the terminal assignment number of the call destination. An outgoing call message creation unit 812 creates the outgoing call message to which the IP address of the call destination is added (refer to FIG. 6). An outgoing call transmission unit 813 transmits the outgoing call created by the outgoing call message creation unit 812 to the IP address of the call destination. Here, as a whole, the outgoing call reception unit 809, the call destination terminal assignment number acquisition unit 810, the call destination IP address acquisition unit 811, the outgoing call message creation unit 812, and the outgoing call transmission unit 813 function as an outgoing call relay control unit.

<<Functional Configuration of Terminal Assignment Number Server>>

Figure 9:
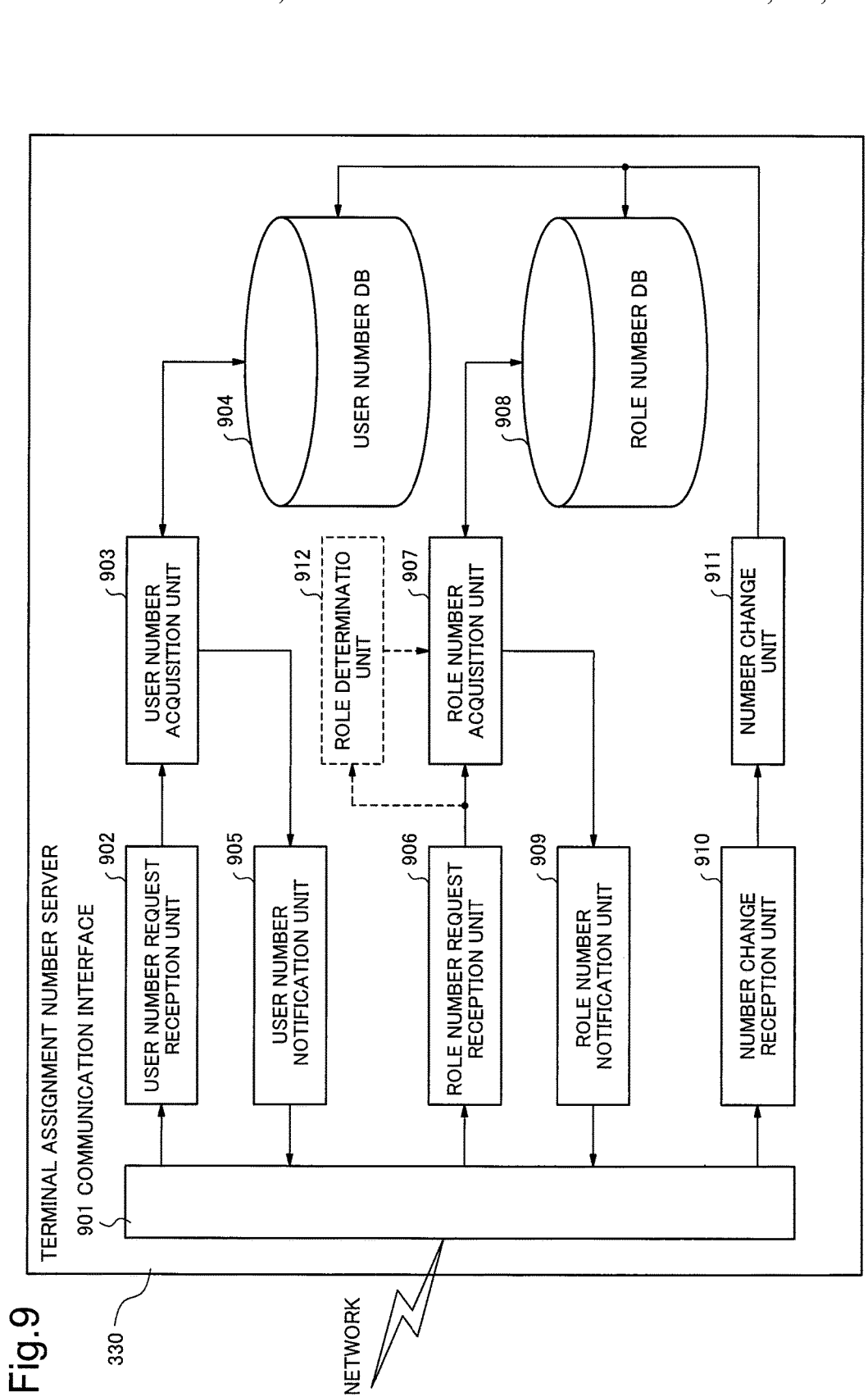
FIG. 9 is a figure showing a functional configuration of a terminal assignment number server according to a third exemplary embodiment of the present invention.

FIG. 9 is a figure showing a functional configuration of the terminal assignment number server 330 according to the exemplary embodiment. Further, each functional configuration unit shown in FIG. 9 may be realized by hardware individually or each functional configuration unit may be realized by executing a program stored in the memory or the storage by the CPU. In this case, with respect to the data required for each process, for example, the data, the database, and the programs that are usually used are stored in the storage and the temporary data is stored in the RAM.

A communication interface 901 is an interface through which the terminal assignment number server 330 communicates with the communication terminal 200 via the network. A user number request reception unit 902 receives a user number request corresponding to the user ID at the time of login from the communication terminal 200. A user number acquisition unit 903 acquires the user number that is the terminal assignment number during login from a user number database (hereinafter, referred to as DataBase (DB)) 904 on the basis of the user ID. A user number notification unit 905 notifies the communication terminal 200 of the acquired user number. The user number DB 904 holds the user number associated with the user ID.

A role number request reception unit 906 receives, from the communication terminal 200, the role number request corresponding to the role during logout. A role number acquisition unit 907 acquires the role number that is the terminal assignment number during logout from a role number DB 908 on the basis of the role. A role number notification unit 909 notifies the communication terminal 200 of the acquired role number. The role number DB 908 holds the role number associated with the role.

Further, the user number of the user number DB 904 and the role number of the role number DB 908 can be changed. A role number change unit 911 changes the user number of the user number DB 904 and the role number of the role number DB 908 on the basis of the information received by a number reception unit 910. Further, when the communication terminal 200 requests the terminal assignment number server 330 to assign the role number, the terminal assignment number server 330 may receive information of the current position of the communication terminal, time, or the like instead of the role information and determine the role. In this case, a role determination unit 912 is provided between the role number request reception unit 906 and the role number acquisition unit 907.

(Logout Determination Table)

Figure 10A:
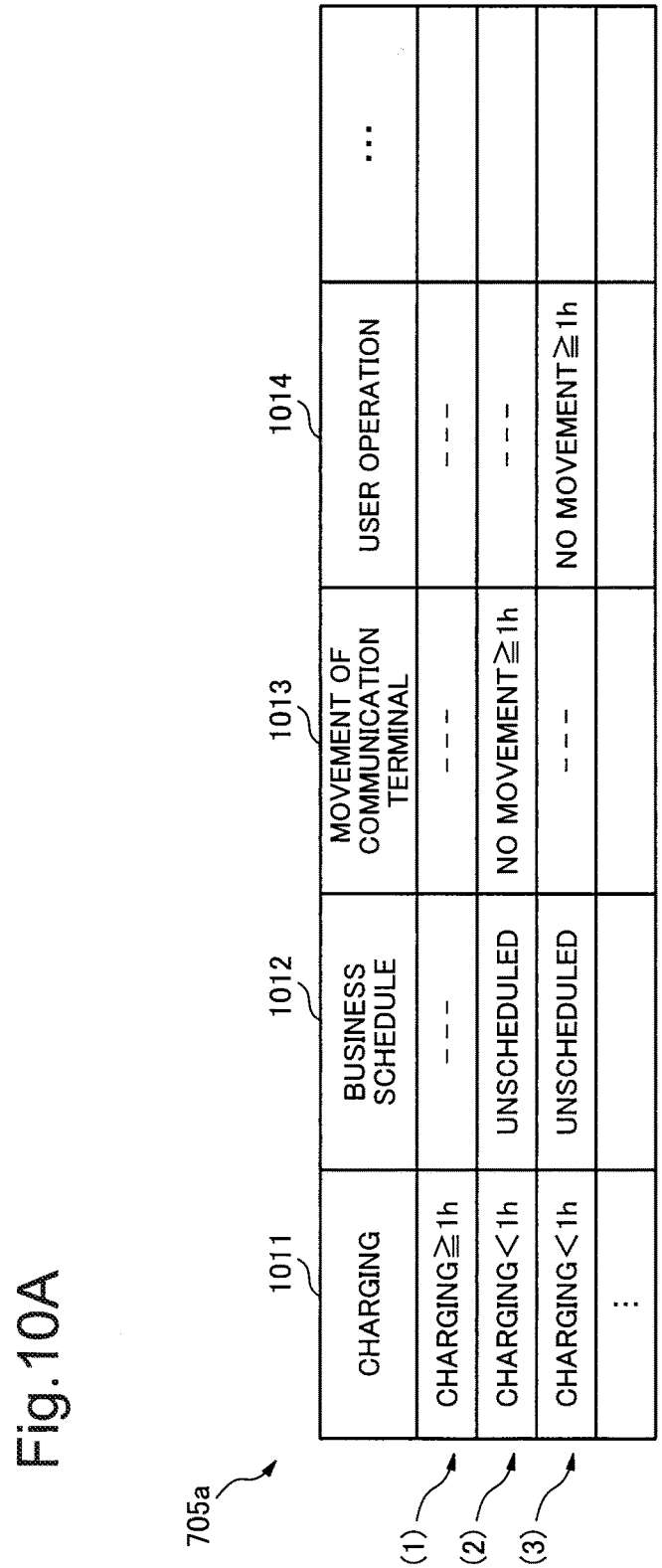
FIG. 10A is a figure showing a structure of a logout determination table according to a second exemplary embodiment of the present invention.

FIG. 10A is a figure showing a structure of a logout determination table 705a according to the exemplary embodiment. The logout determination table 705a is included in the logout determination unit 705 and used for the logout determination when the user does not issue a logout instruction. Further, the conditions for logout are not limited to this example.

FIG. 10A shows the following conditions: (1) a case in which the time for charging the communication terminal exceeds one hour, (2) a case in which it is not included in a user's business schedule and the communication terminal is not carried since at least one hour before, (3) a case in which it is not included in a user's business schedule and the user does not operate the communication terminal since at least one hour before, or the like.

(Role Determination Table)

FIG. 10B is a figure showing a structure of a role determination table 706a according to the exemplary embodiment. The role determination table 706a is included in the role determination unit 706 or the role determination unit 912 and used for determining a role 1024 of the communication terminal on the basis of a user's setting 1021, a current position 1022 of the communication terminal, a time zone 1023, or the like. Further, the conditions for role determination are not limited to this example.

FIG. 10B shows the role determination table including the following roles: (1) Night duty: night duty set by the user or the communication terminal exists in a night duty room in the time zone from 9:00 p.m. to 6:00 a.m., (2) Daytime duty: the communication terminal exists in a night duty room in the time zone from 9:00 a.m. to 6:00 p.m., (3) Emergency response: emergency response set by the user or the communication terminal exists in a 2F in the time zone from 9:00 p.m. to 6:00 a.m., (4) charge of 2F: the user is in charge of 2F or the communication terminal exists in a 2F in the time zone from 9:00 a.m. to 6:00 p.m., (5) charge of 3F: the user is in charge of 3F or the communication terminal exists in a 3F, and the like.

(User Number Database)

Figure 11A:
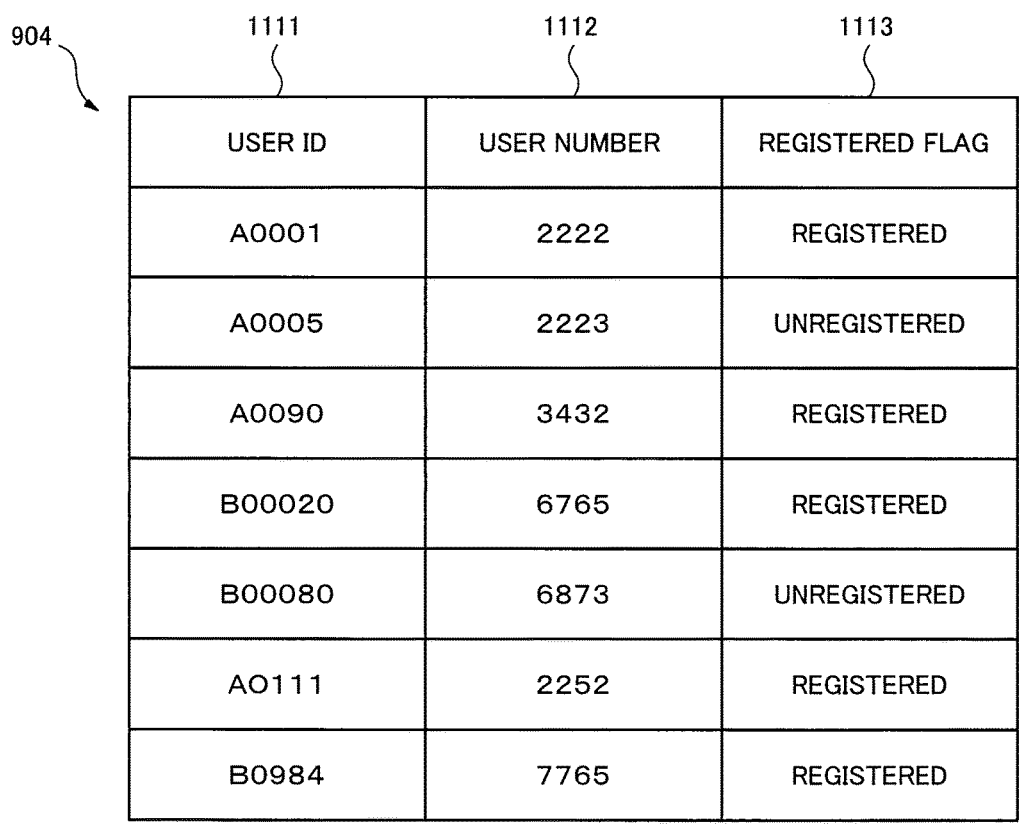
FIG. 11A is a figure showing a structure of a user number database according to a second exemplary embodiment of the present invention.

FIG. 11A is a figure showing a structure of the user number database 904 according to the exemplary embodiment. Further, the structure of the user number database 904 is not limited to the structure shown in FIG. 11A.

In the user number database 904, a user ID 1111 is associated with a user number 1112 and a registered flag 1113 indicating whether a user state is a state in which the user is logged in and registered or a state in which a user is not registered and these information are stored. When the user ID 1111 is received, if the registered flag 1113 corresponding to the user ID 1111 shows a state in which the user is registered, the user number is not sent to the communication terminal. Therefore, the same user number is not assigned to a plurality of the communication terminals.

(Role Number Database)

FIG. 11B is a figure showing a structure of the role number database 908 according to the exemplary embodiment. Further, the structure of the role number database 908 is not limited to the structure shown in FIG. 11B.

In the role number database 908, a role 1121 is associated with a plurality of role numbers 1123 and a registered flag 1124 indicating whether a state of the role number is a state in which each role number is assigned to the communication terminal and registered or a state in which the role number is not registered and these information are stored. Here, each role 1121 is associated with a continuous group number. When the role 1121 is received, the role number associated with the registered flag 1124 indicating that the role number is not registered is assigned to the communication terminal. When the role number is assigned in a such way, the same role number is not assigned to a plurality of the communication terminals.

A role specification standard 1122 specifies the conditions used when the role number database 908 determines the role on the basis of the ID of the wireless LAN base station and the charger that are connected to the communication terminal. When the role is determined by the role number database 908 on the basis of the position information from the communication terminal and the time zone, the role specification standard 1122 is used instead of the conditions shown in FIG. 10B.

(Transfer Table)

Figure 12:
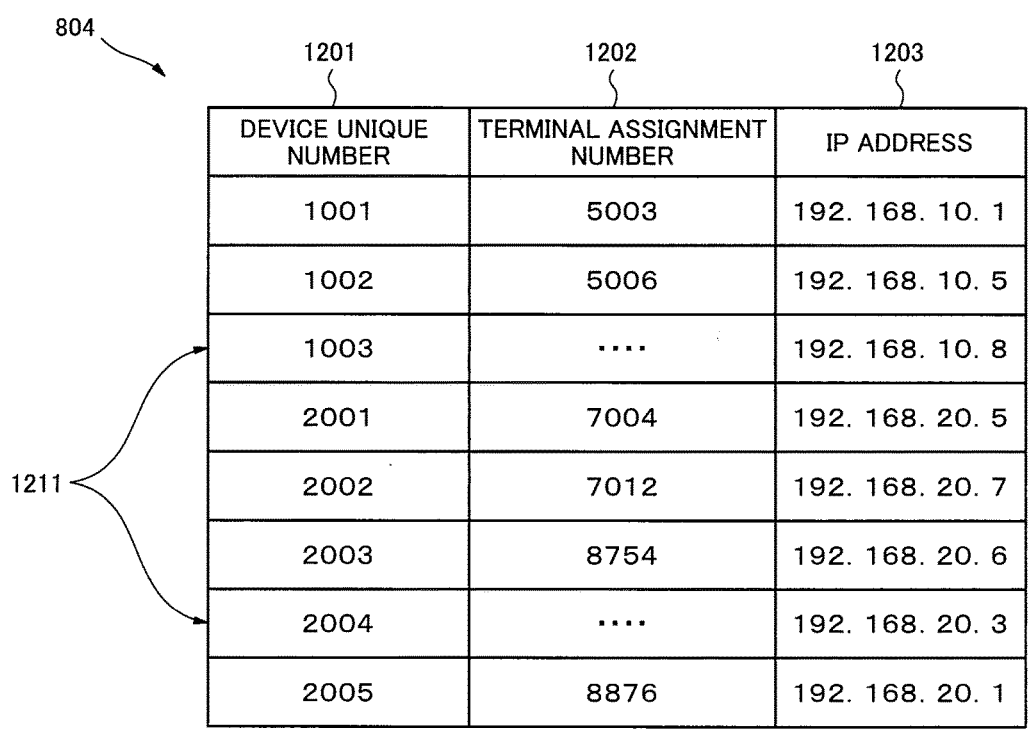
FIG. 12 is a figure showing a structure of a transfer table according to a second exemplary embodiment of the present invention.

FIG. 12 is a figure showing a structure of a transfer table 804 according to the exemplary embodiment.

At the time of registration in a power switch turn-on sequence, in the transfer table 804, a device unique number 1201 of the communication terminal is associated with an IP address 1203 of the communication terminal and these information are stored. The user number corresponding to the user ID at the time of login or the role number during logout are used as a terminal assignment number 1202, it is associated with the IP address 1203 of the communication terminal and these information are stored.

In FIG. 12, in a row 1211 in which the terminal assignment number 1202 is not shown, both the user number and the role number are not registered and this indicates a state in which a power switch is just turned on. In a row other than the row 1211, the terminal assignment number 1202 is indicated and this indicates a state in which one of the user number and the role number is registered.

<<Hardware Configuration of Communication Terminal>>

Figure 13:
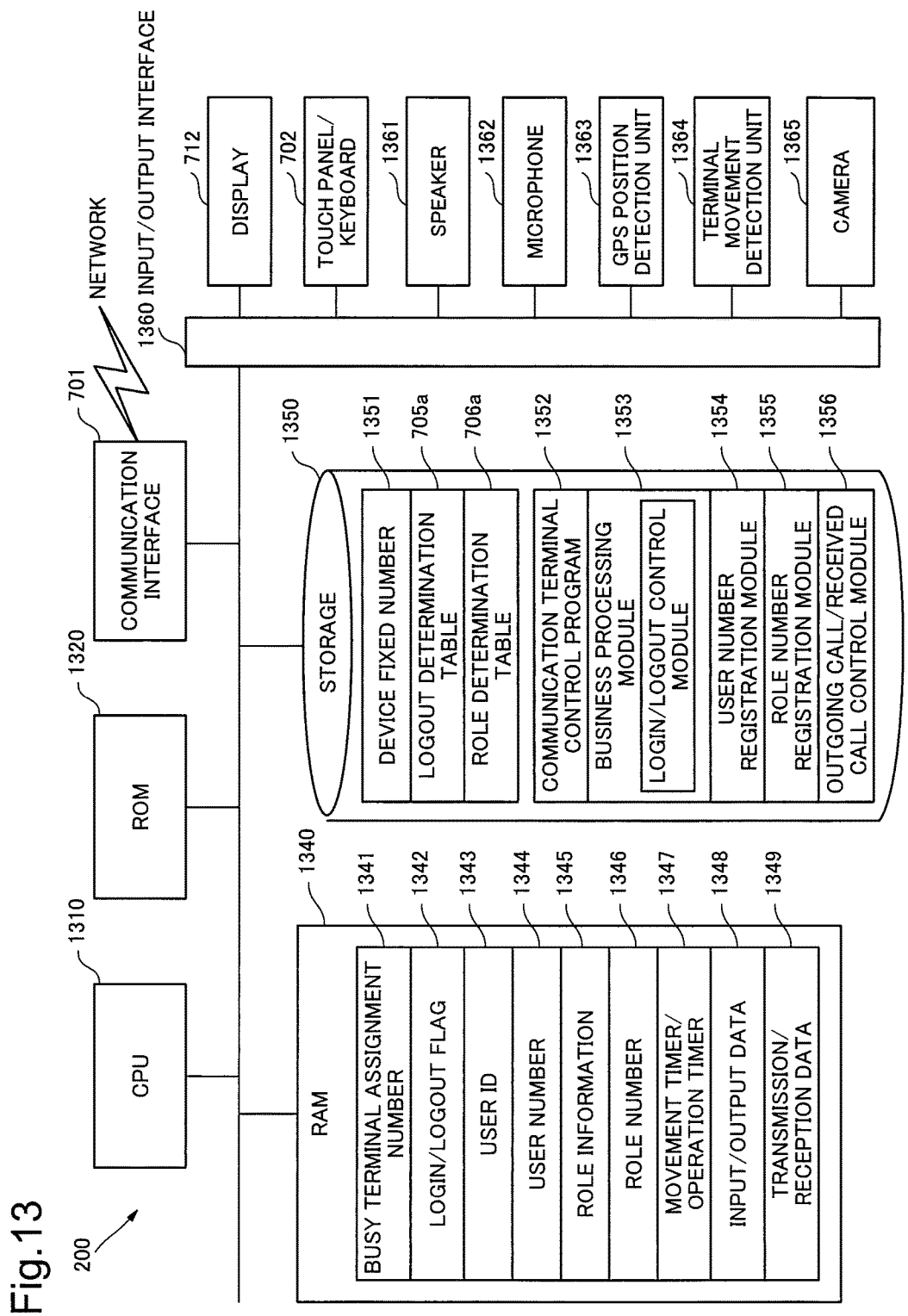
FIG. 13 is a block diagram showing a hardware configuration of a communication terminal according to a second exemplary embodiment of the present invention.

FIG. 13 is a block diagram showing a hardware configuration of the communication terminal 200 according to the exemplary embodiment.

In FIG. 13, a CPU 1310 is a processor for operation control and when it executes a program, a function configuration unit of the communication terminal 200 shown in FIG. 7 is realized. A ROM (Read Only Memory) 1320 stores the fixed data such as the initial data, the program, and the like. Further, the communication interface 701 communicates with another communication terminal and each server via the network 350. Further, the number of the CPUs 1310 is not limited to one, a plurality of the CPUs may be used or it may include a GPU for image processing. It is desirable that the communication interface 701 includes a CPU that is independent from the CPU 1310 and writes/reads the transmission-reception data in/from an area of a RAM 1340. It is desirable to provide a DMAC which transfers the data between the RAM 1340 and a storage 1350 (not shown). Further, it is desirable that an input/output interface 1360 includes a CPU that is independent from the CPU 1310 and writes/reads the input-output data in/from an area of the RAM 1340. Accordingly, when the CPU 1310 recognizes that the data is received or transferred to the RAM 1340, it processes the data. The CPU 1310 prepares a processing result in the RAM 1340 and makes the communication interface 701, the DMAC, or the input/output interface 1360 transmit or transfer the processing result.

The RAM 1340 is the random access memory used by the CPU 1310 as a temporary storage work area. In the RAM 1340, an area in which the data required for realizing the exemplary embodiment is stored is secured. A busy terminal assignment number 1341 is a terminal assignment number which is currently used by the communication terminal 200. A login/logout flag 1342 is a flag indicating whether the communication terminal 200 is in a login state or in a logout state. A user ID 1343 is the ID inputted by the user when the user is logged in to the business server 320 by the communication terminal 200. A user number 1344 is a user number acquired on the basis of the user ID 1343 and is used as the busy terminal assignment number 1341 during login. In the exemplary embodiment, the communication terminal 200 acquires the user number from the terminal assignment number server 330. Role information 1345 is information indicating the role determined on the basis of the current position of the communication terminal 200, the time zone, or the like. A role number 1346 is a role number acquired on the basis of the role information 1345 and used as the busy terminal assignment number 1341 during logout. A movement timer/operation timer 1347 measures time used for determining whether the user is logged out on the basis of the movement of the communication terminal 200 or the user operation. An input/output data 1348 is a data inputted and outputted via the input/output interface 1360. A transmission/reception data 1349 is a data transmitted and received via the communication interface 701.

In the storage 1350, the database, various parameters, the following data required for realizing the exemplary embodiment, or the program is stored. A device fixed number 1351 is a number used as an initial terminal assignment number when the power switch of the communication terminal 200 is turned on. The logout determination table 705a is a table storing a condition at which the logout determination unit 705 determines that the user is logged out (refer to FIG. 10A). A role determination table 706a is a table with which the role determination unit 706 determines the role of the communication terminal 200 on the basis of the current position, the time zone, or the like (refer to FIG. 10B). Further, when the role is not determined by the communication terminal 200, the role determination table 706a is not used. A table with which information for determining the role that is sent to the terminal assignment number server 330 is selected is used instead of the role determination table 706a.

The following program is stored in the storage 1350. A communication terminal control program 1352 is a control program for controlling the whole communication terminal 200. A business processing module 1353 is a module which performs business processes from the login process in which the user is logged in to the business server 320 by the communication terminal 200 to the logout process. The business processing module 1353 includes a login/logout control module which controls the communication between the communication terminal 200 and the business server 320 at the time of login and logout. A user number registration module 1354 is a module which acquires the user number when the communication terminal 200 logs in to the business server and registers it on the private exchange server 310. A role number registration module 1355 is a module which acquires the role number when the communication terminal 200 logs out of the business server and registers it on the private exchange server 310. An outgoing call/ received call control module 1356 is a module which performs control when the communication terminal 200 originates a call to another communication terminal or when the communication terminal 200 receives a call from another communication terminal.

The input/output interface 1360 includes the peripheral device group/external interface 704 shown in FIG. 7 and interfaces input/output data from/to the input-output device. The display 712 and the touch panel/keyboard 702 are connected to the input/output interface 1360. A voice input output unit such as a speaker 1361, a microphone 1362, and the like are connected to the input/output interface 1360. A GPS position detection unit 1363, a terminal movement detection unit 1364, a camera 1365, and the like are further connected to the input/output interface 1360. The input-output device connected to the input/output interface 1360 is not limited to these components. Various input-output devices can be connected according to the use of the communication terminal 200. In a specific use of the communication terminal 200, the above-mentioned input-output device is not connected to the communication terminal 200.

Further, in the RAM 1340 and the storage 1350 shown in FIG. 13, a general-purpose function and the program or data related to another realizable function that the communication terminal 200 has are not shown.

<<Processing Procedure of Communication Terminal>>

Figure 14A:
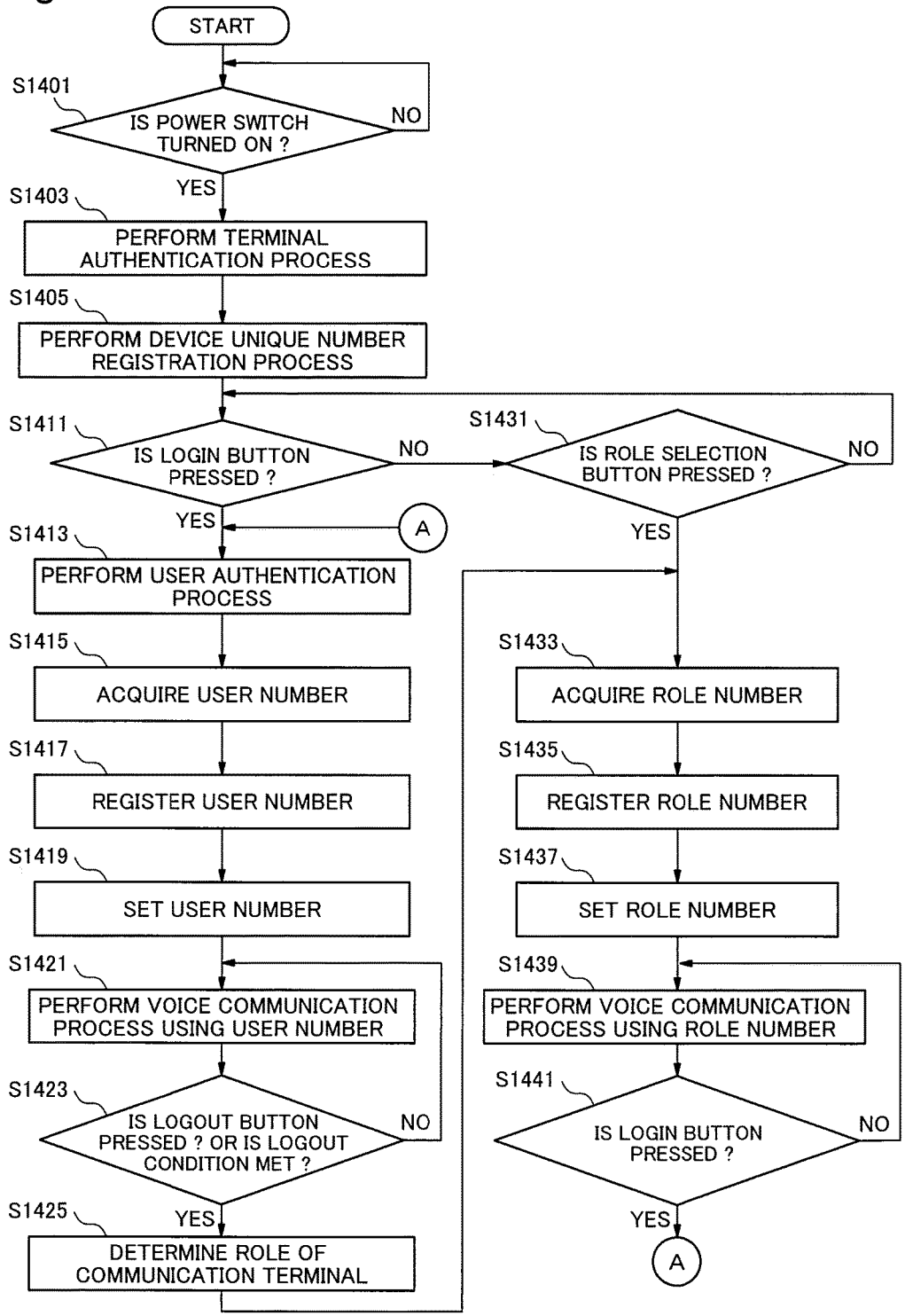
FIG. 14A is a flowchart showing a processing procedure of a communication terminal according to a second exemplary embodiment of the present invention.

FIG. 14A is a flowchart showing a processing procedure of the communication terminal 200 according to the exemplary embodiment. The flowchart is executed by the CPU 1310 shown in FIG. 13 while using the RAM 1340 to realize the function configuration unit shown in FIG. 7.

In step S1401, the communication terminal 200 waits for the turn on of the power switch. When the power switch is turned on, in step S1403, the communication terminal 200 performs the terminal authentication process to the authentication server 340. When the communication terminal 200 is authenticated, in step S1405, the communication terminal 200 acquires the held device unique number and performs the registration process for registering it on the private exchange server 310.

In step S1411, the communication terminal 200 determines whether or not the login button 213 is pressed. When the login button 213 is not pressed, in step S1431, the communication terminal 200 determines whether or not the role selection button 214 is pressed.

When the login button 213 is pressed, in step S1413, the communication terminal 200 performs the user authentication process to the authentication server 340 on the basis of the user ID and the password which are inputted by the user in the login operation. When the user is authenticated, in step S1415, the communication terminal 200 acquires the user number corresponding to the user ID. In the exemplary embodiment, the communication terminal 200 acquires the user number from the terminal assignment number server 330. Next, in step S1417, the communication terminal 200 registers the acquired user number on the private exchange server 310. When the communication terminal 200 receives the notification of user number registration completion from the private exchange server 310, in step S1419, the communication terminal 200 sets the user number as the terminal assignment number of the communication terminal 200. The communication terminal 200 performs information exchange with the business server 320 and in step S1421, communicates with another communication terminal by using the user number as needed.

In step S1423, the communication terminal 200 determines whether or not the logout button 226 is pressed or whether or not the logout condition is met and the login state is kept during this process. When the logout button 226 is pressed or the logout condition is met, in step S1425, the communication terminal 200 determines the role of the communication terminal 200 on the basis of the current position of the communication terminal 200 and the time zone. Further, when the communication terminal 200 does not determine the role, the process of step S1425 is changed to a process for collecting information required for determining the role that is sent to the terminal assignment number server 330. The communication terminal 200 performs a process for acquiring the role number in step S1433.

When the role selection button 214 is pressed in step S1431 or the logout process is performed, in step S1433, the communication terminal 200 acquires the role number corresponding to the role from the terminal assignment number server 330. Next, in step S1435, the communication terminal 200 registers the acquired role number on the private exchange server 310. When the communication terminal 200 receives the notification of the role number registration completion from the private exchange server 310, the communication terminal 200 sets the role number as the terminal assignment number of the communication terminal 200 in step S1437. The communication terminal 200 communicates with another communication terminal by using the role number as needed in step S1439.

In step S1441, the communication terminal 200 determines whether or not the login button 234 is pressed and continues the process using the role number during this determination process. When the login button 234 is pressed, the process proceeds to step S1413 and the communication terminal 200 starts to perform the login process.

Further, the role number change caused by the role change is not shown in the figure. The role number changes when the following condition is met: a case in which in the non-business mode in which the role number is used as the terminal assignment number, the role can be changed, the role number is inputted from the numeric keyboard 237, and the role change button 238 is pressed, a case in which the communication terminal 200 exists at a position corresponding to the different role for a predetermined time or more, a case in which the time zone is changed, or the like. A role name may be inputted instead of inputting the role number from the numeric keyboard 237.

Further, the flowchart shown in FIG. 14A ends when the power switch is turned off.

(Call Originating Process and Call Receiving Process)

Figure 14B:
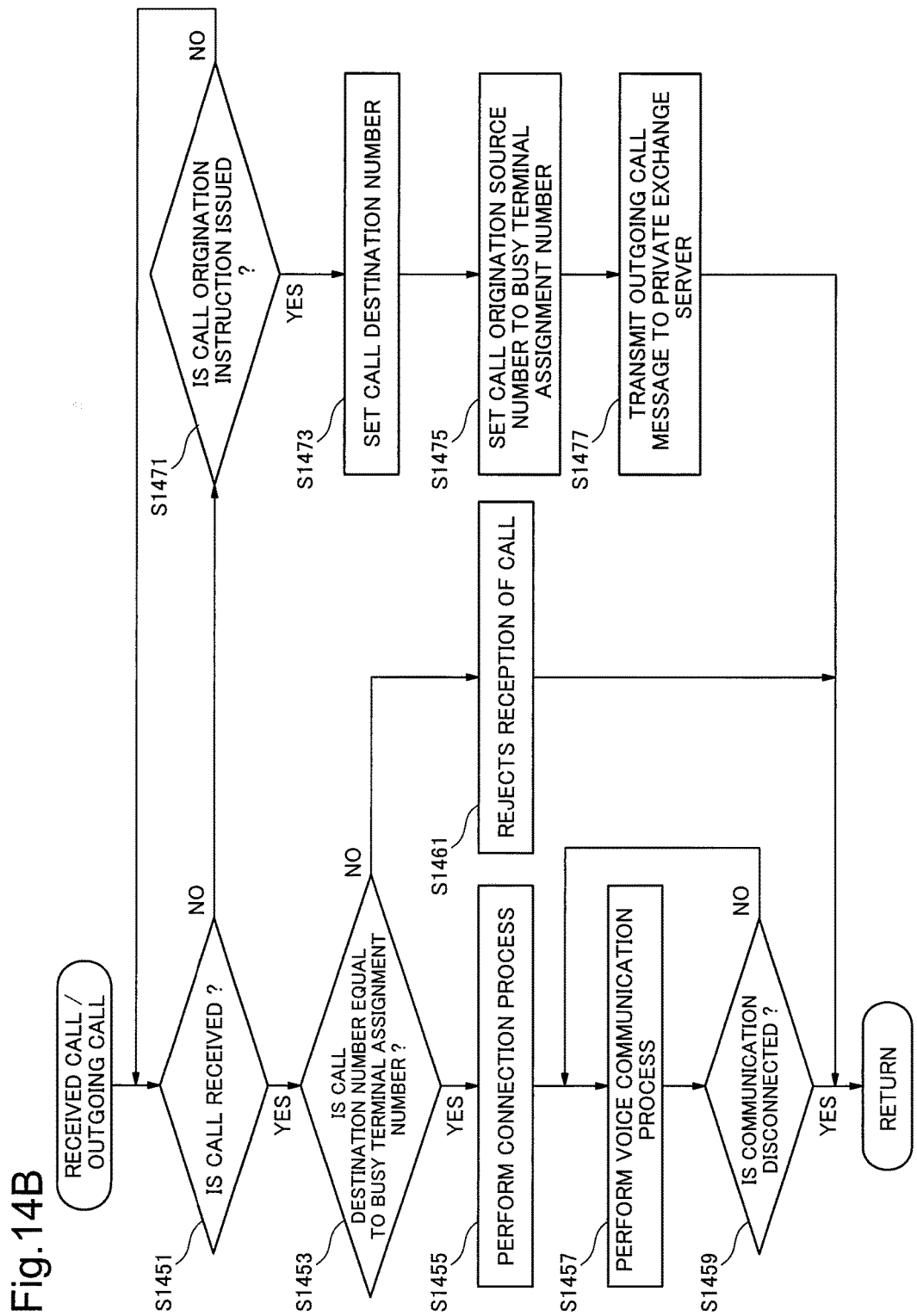
FIG. 14B is a flowchart showing a procedure of a call originating process and a call receiving process according to a second exemplary embodiment of the present invention.

FIG. 14B is a flowchart showing a procedure of a call originating process and a call receiving process according to the exemplary embodiment. This flowchart shows a process related to the call origination/call reception that is a part of the voice communication process of steps S1321 and S1439 shown in FIG. 14A.

In step S1451, the communication terminal 200 waits for the reception of the call from another communication terminal. When the call is received, the communication terminal 200 reads a call destination number from the received message and compares it with the busy terminal assignment number of the communication terminal 200 in step S1453. When the call destination number is not equal to the busy terminal assignment number, the communication terminal 200 rejects the reception of the call in step S1461.

When the call destination number is equal to the busy terminal assignment number, the communication terminal 200 performs the process for connecting with the call originating communication terminal in step S1455. The communication terminal 200 performs the process of voice communication to the call originating communication terminal in step S1457. In step S1459, the communication terminal 200 continues the voice communication process until the voice communication is disconnected and ends the call receiving process when the voice communication is disconnected.

When no call is received, the communication terminal 200 waits for a call origination instruction issued when the user presses the call origination button 222 or the call origination button 232 in step S1471. When the call origination instruction is issued, the communication terminal 200 sets the call destination number to the outgoing call message on the basis of the telephone book or the user's input in step S1473. Next, the communication terminal 200 sets the call origination source number to the busy terminal assignment number in step S1475. The communication terminal 200 transmits the outgoing call message to the private exchange server 310 in step S1477.

<<Processing Procedure of Private Exchange Server>>

Figure 15:
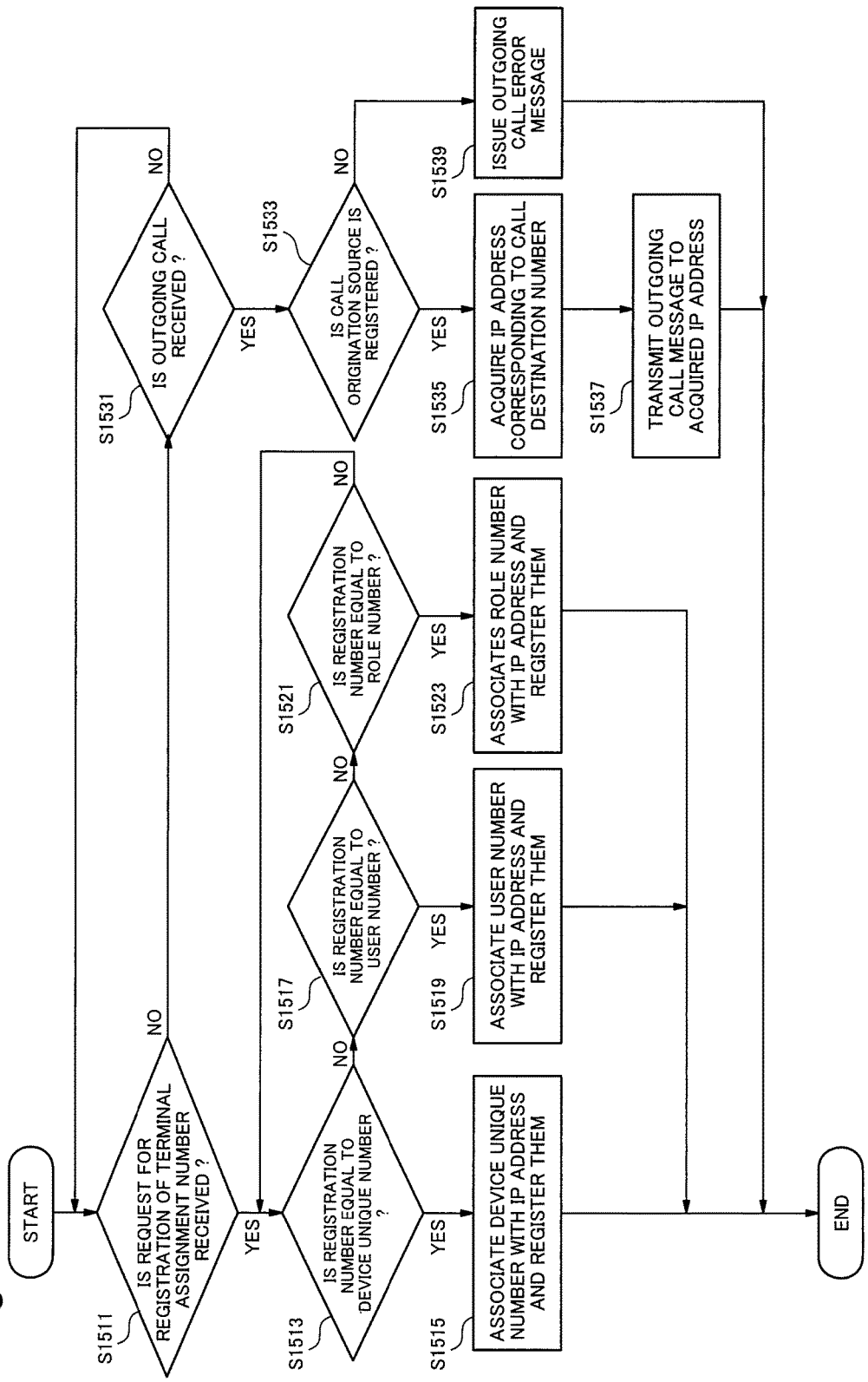
FIG. 15 is a flowchart showing a processing procedure of a private exchange server according to a second exemplary embodiment of the present invention.

FIG. 15 is a flowchart showing a processing procedure of the private exchange server 310 according to the exemplary embodiment. This flowchart is executed by the CPU which performs a process of the private exchange server 310 to realize the function configuration unit shown in FIG. 8. Further, the process in the flowchart shown in FIG. 15 starts when any event occurs in the private exchange server 310.

In step S1511, the private exchange server 310 determines whether or not a request for the registration of the terminal assignment number used by the communication terminal 200 is received. When the terminal assignment number registration request is not received, the private exchange server 310 determines whether or not the outgoing call from one of the communication terminals 200 is received in step S1531.

When the terminal assignment number registration request is received, in response to the registration request, the private exchange server 310 determines whether the registration number is equal to the device unique number in step S1513, determines whether the registration number is equal to the user number in step S1517, and determines whether the registration number is equal to the role number in step S1521. When it is the request for the registration of the device unique number, the private exchange server 310 associates the device unique number with the IP address of the communication terminal 200 which transmits the registration request and registers the device unique number in step S1515. When it is the request for the registration of the user number, the private exchange server 310 associates the user number with the IP address of the communication terminal 200 which transmits the registration request and registers the user number in step S1519. When it is the request for the registration of the role number, the private exchange server 310 associates the role number with the IP address of the communication terminal 200 which transmits the registration request and registers the role number in step S1523. Further, in a process of step S1519 or step S1523, even when the user number or the role number is registered, the device unique number is held as the device registration.

When the outgoing call is received, the private exchange server 310 determines whether or not the communication terminal of the call origination source is registered on the private exchange server 310 on the basis of the call origination source number in the outgoing call message in step S1533. Namely, it is determined whether or not the call origination source number is equal to one of the device unique number, the user number, and the role number that are registered. When the call origination source is not registered, the private exchange server 310 stops the relay of the outgoing call and issues an outgoing call error message in step S1539. When the call origination source is registered, the private exchange server 310 acquires the IP address corresponding to the call origination source number in step S1535. In step S1537, the private exchange server 310 transmits the outgoing call message to the acquired IP address.

<<Processing Procedure of Terminal Assignment Number Server>>

Figure 16:
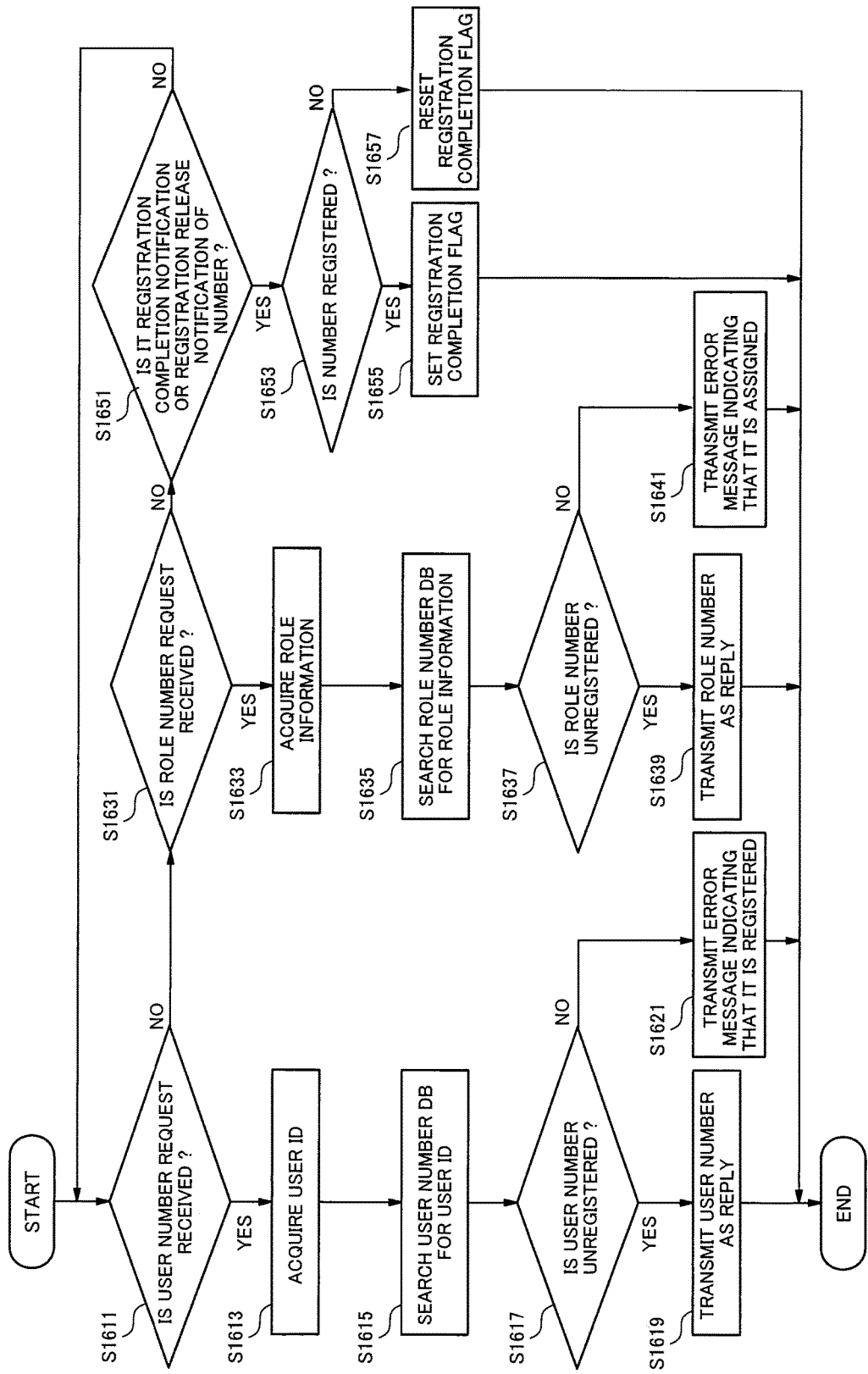
FIG. 16 is a flowchart showing a processing procedure of a terminal assignment number server according to a second exemplary embodiment of the present invention.

FIG. 16 is a flowchart showing a processing procedure of the terminal assignment number server 330 according to the exemplary embodiment. This flowchart is executed by the CPU which performs a process of the terminal assignment number server 330 to realize the function configuration unit shown in FIG. 9. Further, the process in the flowchart shown in FIG. 16 starts when any event occurs in the terminal assignment number server 330.

In step S1611, the terminal assignment number server 330 determines whether or not the user number request from the communication terminal 200 is received. When the user number request is not received, the terminal assignment number server 330 determines whether or not the role number request from the communication terminal 200 is received in step S1631. When the user number request is not received and the role number request is not received, the terminal assignment number server 330 determines whether or not the registration completion notification or the registration release notification of the user number or the role number from the communication terminal 200 or the private exchange server 310 is received in step S1651.

When the user number request is received, the terminal assignment number server 330 acquires the user ID from a user number request message in step S1613. In step S1615, the terminal assignment number server 330 searches the user number DB 904 for the user ID. In step S1617, the terminal assignment number server 330 determines whether or not the found user number is unregistered. When it is unregistered, the terminal assignment number server 330 transmits a result to the communication terminal which requests the user number in step S1619. When it is registered, it is registered as the number for another communication terminal. Therefore, in order to avoid duplication, in step S1621, the terminal assignment number server 330 transmits an error message indicating that it is registered to the communication terminal which requests for the user number.

When the role number request is received, the terminal assignment number server 330 acquires the role information from the registration number request message in step S1633. In step S1635, the terminal assignment number server 330 searches the role number DB 908 for the role information. In step S1637, the terminal assignment number server 330 determines whether or not the found role number is unregistered. When the number is unregistered, the terminal assignment number server 330 transmits the number to the communication terminal which requests the role number in step S1639. When all the numbers are registered, all the numbers are assigned to the other communication terminals. Therefore, in step S1641, the terminal assignment number server 330 transmits an error message indicating that all the numbers are assigned to the communication terminal which requests for the role number.

When the registration completion notification or the registration release notification of the user number or the role number is received, the terminal assignment number server 330 determines whether or not it is the registration completion notification in step S1653. When it is the registration completion notification, the terminal assignment number server 330 sets a registration completion flag in step S1655. On the other hand, when it is the registration release notification, the terminal assignment number server 330 resets the registration completion flag in step S1657. By performing the processes of steps S1651 to S1657, the same terminal assignment number is surely prevented from being assigned to a plurality of communication terminals.

In addition to the effect of the first exemplary embodiment, by using this exemplary embodiment, an effect in which registration or deletion of the user, change of the role number, or the like can be performed by only changing data in the server with simple operation because it is not necessary to assign the user number and the role number to the communication terminal in advance can be obtained.

Third Exemplary Embodiment

Next, a communication processing system according to a third exemplary embodiment of the present invention will be described by using FIG. 17 to FIG. 20. In the communication processing system according to the exemplary embodiment, the user number and the role number are assigned to the communication terminal as a database in advance. This is a difference between the communication processing system according to the second exemplary embodiment and the communication processing system according to the third exemplary embodiment. The same reference numbers are used for the units having the same configuration and function as the second exemplary embodiment and the description of the unit will be omitted.

Further, when the role number is assigned to the communication terminal as the database in advance, it is desirable to avoid duplication of the same role number. Further, the assignment of the database to the communication terminal may be performed at the time of turning on the power switch, at the time of changing the system, or in a periodic manner.

In addition to the effect of the first exemplary embodiment, by using this exemplary embodiment, an effect in which because the role number unique to the communication terminal is assigned in advance and whereby, the same terminal assignment number is not assigned to a plurality of communication terminals, it is not necessary to check the state of registration and the number of the overheads for the process can be reduced can be obtained.

<<Communication Processing System>>

The communication processing system according to the exemplary embodiment will be described with reference to FIG. 17 and FIG. 18.

(System Configuration)

Figure 17:
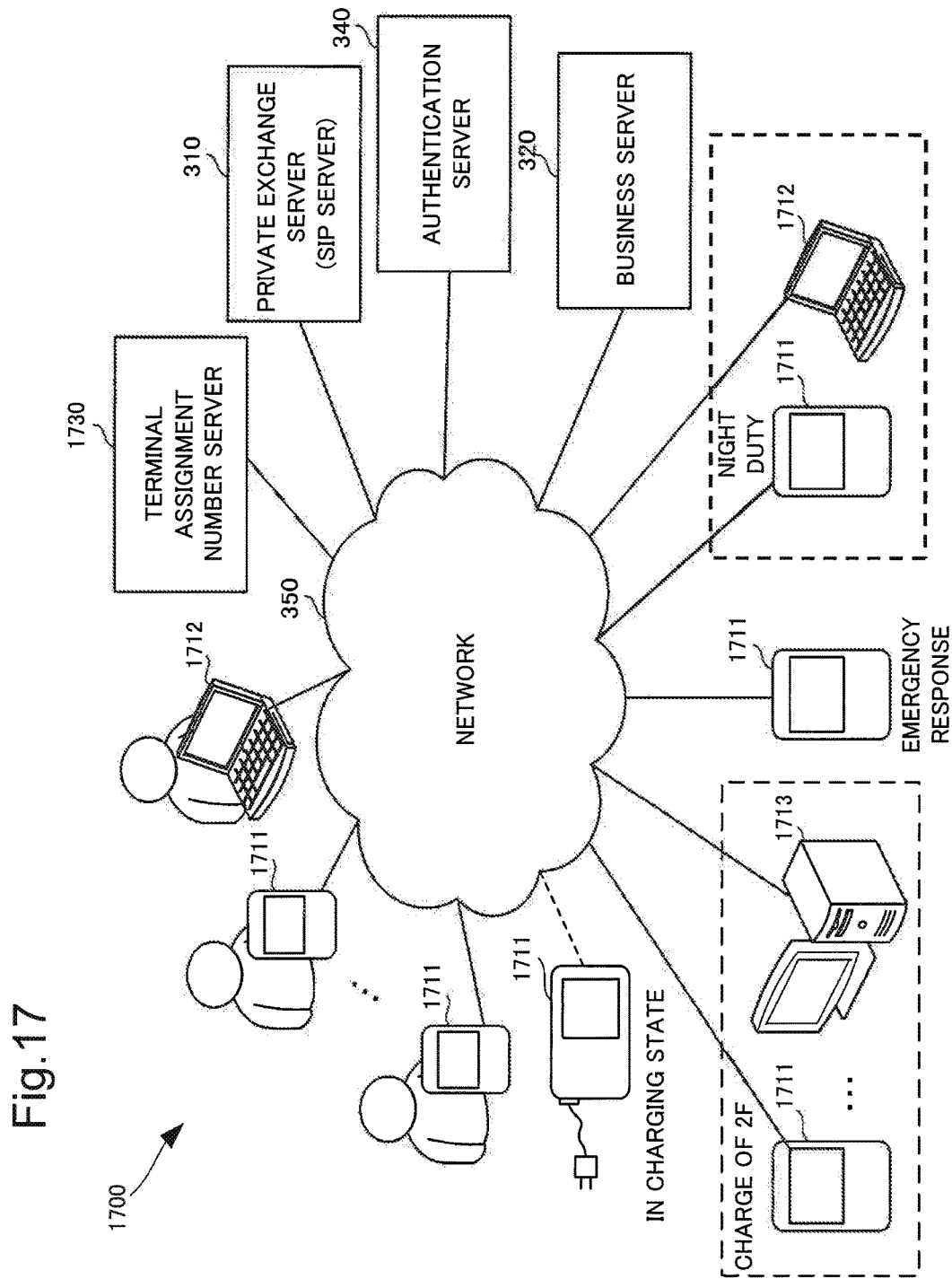
FIG. 17 is a block diagram showing a configuration of a communication processing system according to a third exemplary embodiment of the present invention.

FIG. 17 is a block diagram showing a configuration of a communication processing system 1700 according to the exemplary embodiment. Further, in FIG. 17, the same reference numbers are used for the components having the same configuration and function as the component shown in FIG. 3 and the description of the unit will be omitted.

In FIG. 17, a portable terminal 1711, a laptop PC 1712, or a desktop PC 1713 that is a communication terminal 1710 includes a terminal assignment number DB. In FIG. 3, the terminal assignment number server 330 assigns the user number or the role number to the communication terminal when it is needed. However, in this exemplary embodiment, a terminal assignment number delivery server 1730 which downloads the terminal assignment number DB to each communication terminal when the power switch of each communication terminal is turned on is included instead of the terminal assignment number server 330. Further, in a case in which a fixed number of the communication terminals are used and the user number and the role number are assigned to each communication terminal in advance, the terminal assignment number delivery server 1730 is not used.

(Registration Process of Terminal Assignment Number)

Figure 18:
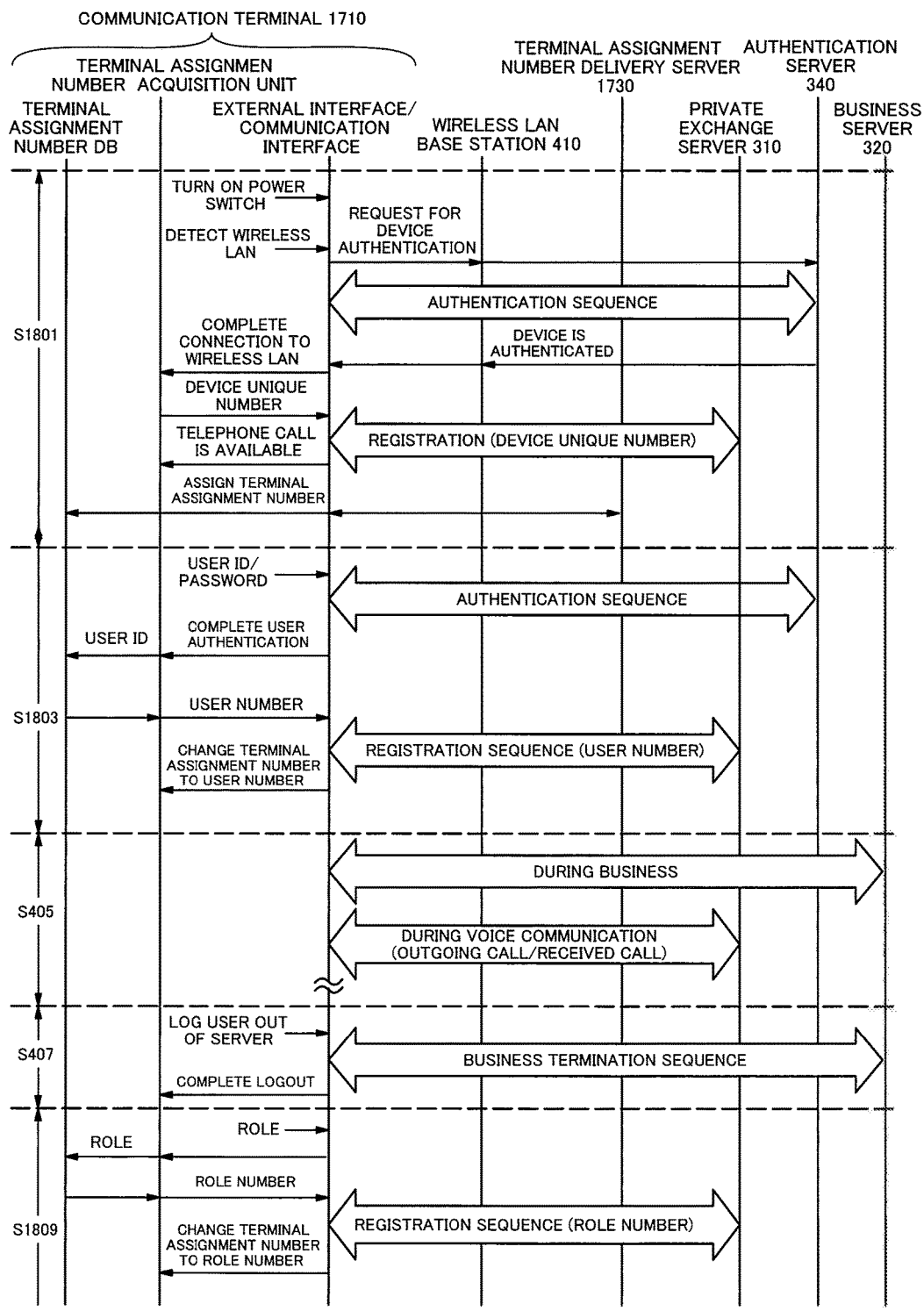
FIG. 18 is a sequence diagram showing a procedure of a process of registering a terminal assignment number by a communication terminal in a communication processing system according to a third exemplary embodiment of the present invention.

FIG. 18 is a sequence diagram showing a procedure of a process of registering the terminal assignment number from the communication terminal 1710 in the communication processing system 1700 according to the exemplary embodiment. Further, in FIG. 18, the same step numbers are used for the steps of performing the same process as the process of the step shown in FIG. 4 and the description of the step will be omitted.

In step S1801, when the power switch of the communication terminal 1710 is turned on and voice communication becomes available by using the communication terminal, a terminal assignment number table is downloaded to the terminal assignment number DB of the communication terminal 1710 from the terminal assignment number delivery server 1730. This is a difference from the process of step 401 shown in FIG. 4. The user number that corresponds to each of all the user IDs is downloaded but one role number is assigned and downloaded to each role of each communication terminal. Further, the timing of the download of the terminal assignment number table that is performed from the terminal assignment number delivery server 1730 to the terminal assignment number DB of the communication terminal 1710 is not limited to the timing shown in FIG. 18.

In step S1803, the user number is acquired from the terminal assignment number DB held in the communication terminal 1710. This is a difference from the process of step S403 shown in FIG. 4. The other process is the same as that of step S403 shown in FIG. 4. Therefore, the description will be omitted.

In step S1809, the role number is acquired from the terminal assignment number DB held in the communication terminal 1710. This is a difference from the process of step S409 shown in FIG. 4. The other process is the same as that of step S409 shown in FIG. 4. Therefore, the description will be omitted.

<<Functional Configuration of Communication Terminal>>

Figure 19:
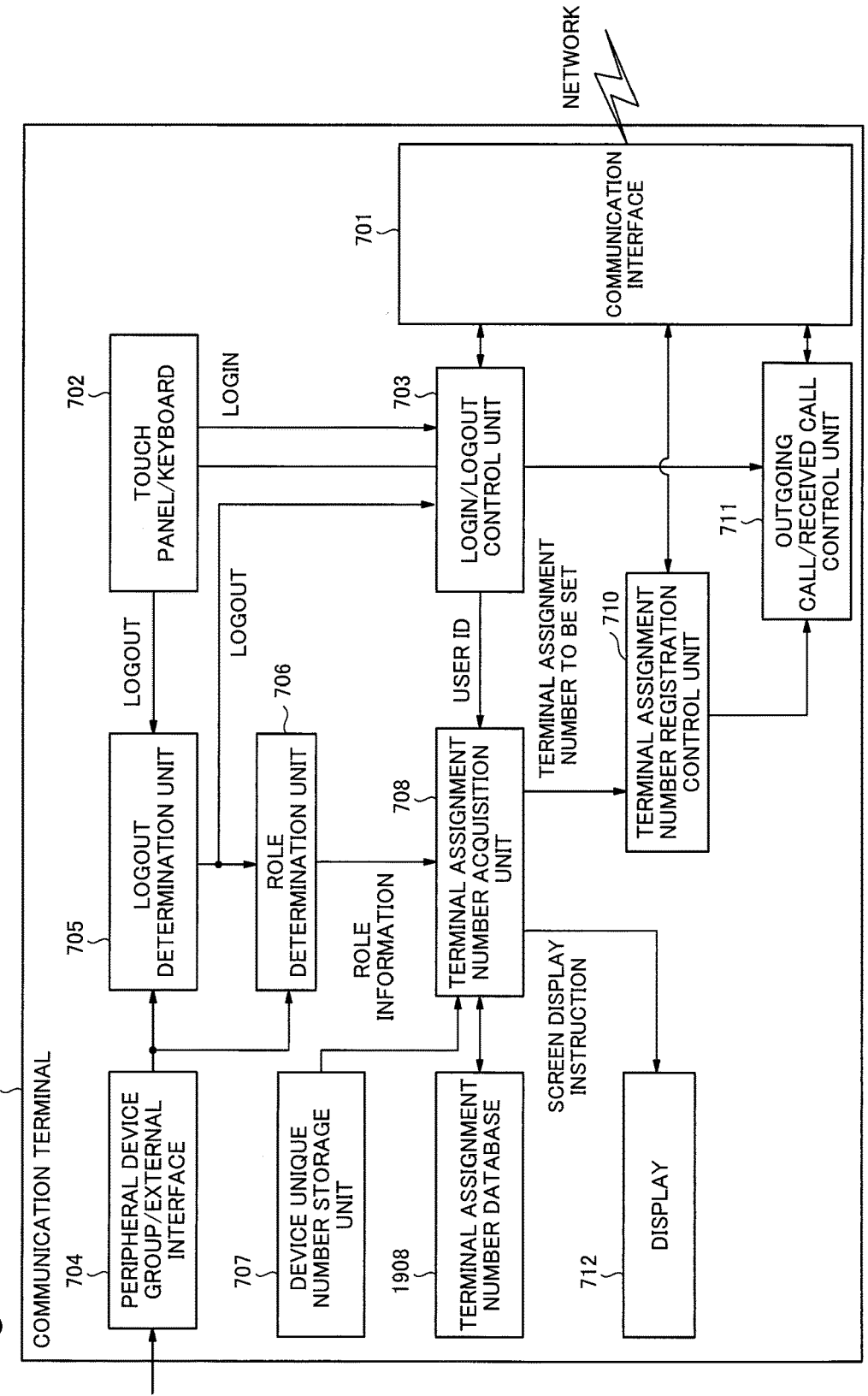
FIG. 19 is a block diagram showing a functional configuration of a communication terminal according to a third exemplary embodiment of the present invention.

FIG. 19 is a block diagram showing a functional configuration of the communication terminal 1710 according to the exemplary embodiment. Further, in FIG. 19, the same reference numbers are used for the units having the same configuration and function as the unit shown in FIG. 7 and the description of the unit will be omitted.

In FIG. 19, a terminal assignment number database 1908 is added. This is a difference from the block diagram shown in FIG. 7. The terminal assignment number database 1908 stores the user number and the role number which are acquired by the terminal assignment number acquisition unit 708.

(Terminal Assignment Number Database)

FIG. 20 shows a structure of the terminal assignment number database 1908 according to the exemplary embodiment. Further, the structure of the terminal assignment number database 1908 is not limited to the structure shown in FIG. 20.

In the terminal assignment number database 1908, a structure of a hold area 2010 in which the user number is stored is the same as the structure obtained by eliminating the registered flag 1113 from the structure of the user number database 904 shown in FIG. 11A. The structure of the hold area 2010 of each communication terminal 1710 is the same as each other.

In the terminal assignment number database 1908, a structure of a hold area 2020 which stores the role number is the same as a structure obtained by eliminating the registration completion flag 1124 from the structure of the role number DB 908 shown in FIG. 11B. In the hold area 2020, one role number 2023 is assigned to each role of the communication terminal.

Each communication terminal has such terminal assignment number database 1908. Therefore, the same role number is prevented from being assigned to a plurality of the communication terminals without increasing a load for the check of the assignment number.

Further, in this exemplary embodiment, the user number and the role number are acquired from the database in the communication terminal 1710. This is only a difference between the second exemplary embodiment and the third exemplary embodiment. The operation of acquiring the user number and the role number is the same as that of the second exemplary embodiment.

In addition to the effect of the first exemplary embodiment, by using the exemplary embodiment, an effect in which because the role number unique to the communication terminal is assigned in advance and whereby, the same terminal assignment number is not assigned to a plurality of communication terminals, it is not necessary to check the state of registration and the number of the overheads for the process can be reduced can be obtained.

Fourth Exemplary Embodiment

Next, a communication processing system according to a fourth exemplary embodiment of the present invention will be described by using FIG. 21 and FIG. 22. The communication processing system according to the fourth exemplary embodiment has a configuration in which even when connection using the terminal assignment number becomes unavailable by a specific operation for example, the OFF/ON operation of the power switch of the communication terminal, the connection can be made available by using the unique number of the communication terminal. This is a difference between the communication processing system according to the fourth exemplary embodiment and the communication processing system according to the second and third exemplary embodiments. The same reference numbers are used for the units having the same configuration and function as the second and third exemplary embodiments and the description of the unit will be omitted.

In addition to the effect of the first to third exemplary embodiments, by using this exemplary embodiment, an effect in which even when connection using the terminal assignment number becomes unavailable, the connection can be made available by using another number and the number of the communication terminals in an unavailable state can be reduced as much as possible can be obtained.

(Voice Communication Process Between Communication Terminals)

Figure 21:
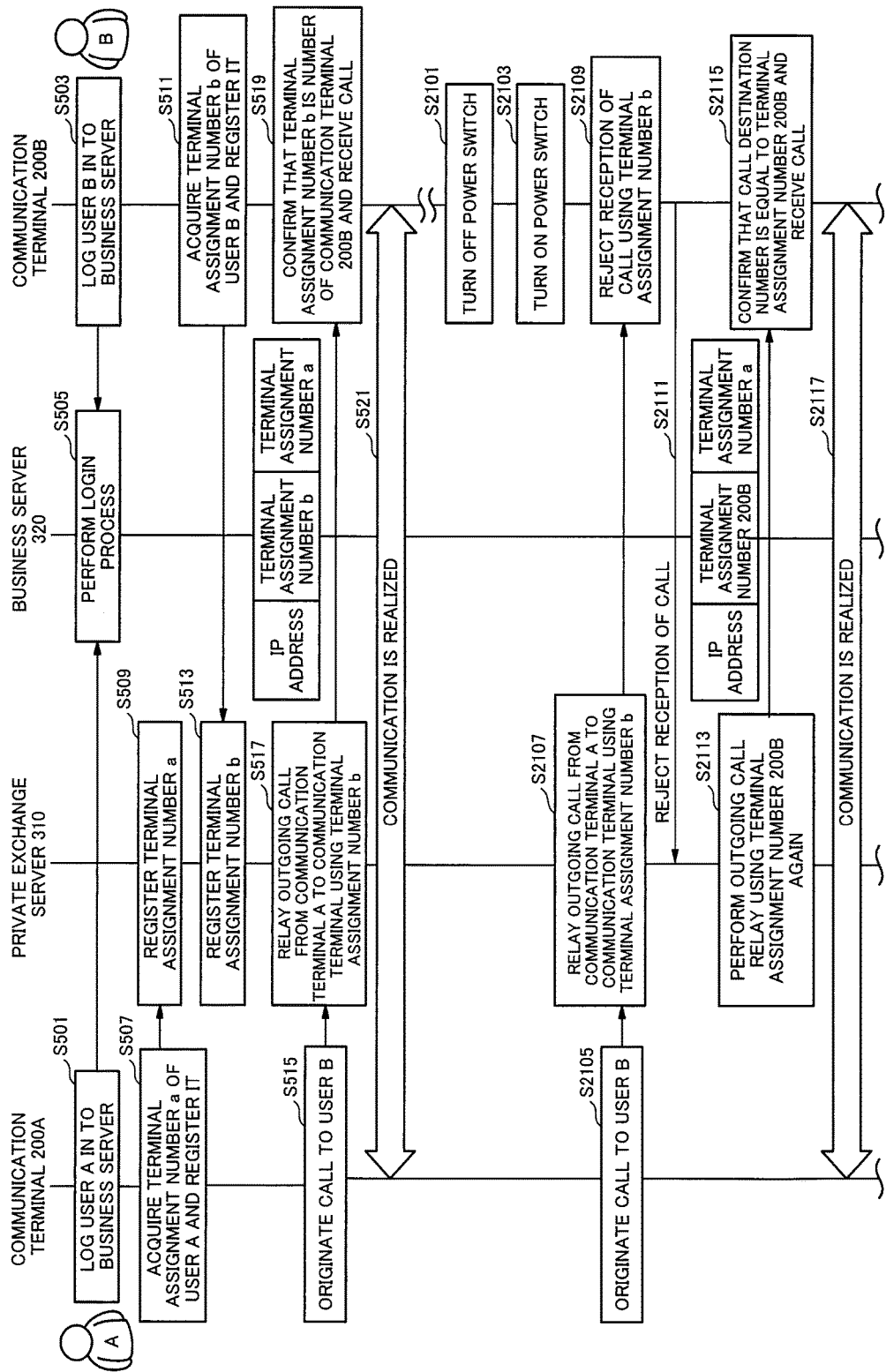
FIG. 21 is a sequence diagram showing a procedure of a voice communication process between communication terminals in a communication processing system according to a fourth exemplary embodiment of the present invention.

FIG. 21 is a sequence diagram showing a procedure of the voice communication process between communication terminals in a communication processing system according to this exemplary embodiment. In FIG. 21, the same step numbers are used for the steps of performing the same process as the process of the step shown in FIG. 5 and the description of the step will be omitted.

It is assumed that the power switch of the communication terminal 200B is turned off and on in steps S2101 and S2103. The communication terminal 200B uses the device unique number as the initial terminal assignment number. However, the private exchange server 310 holds the terminal assignment number b of the communication terminal 200B.

Here, in step S2105, when the communication terminal 200A originates a call to a user B using the terminal assignment number b, the private exchange server 310 uses the terminal assignment number b as the call destination number and sends the outgoing call message to the communication terminal 200B in step S2107. However, because the terminal assignment number of the communication terminal 200B is the device unique number, the communication terminal 200B rejects the reception of the call due to number conflict in step S2109.

When the reception of the call is rejected by the communication terminal 200B in step S2111, the private exchange server 310 changes the call destination number to the device unique number of the communication terminal 200B and performs the outgoing call relay once again in step S2113. In step S2115, because the call destination number of the outgoing call message is equal to the device unique number of the communication terminal 200B and there is no conflict, the communication terminal 200B receives the outgoing call message.

(Processing Procedure of Private Exchange Server)

Figure 22:
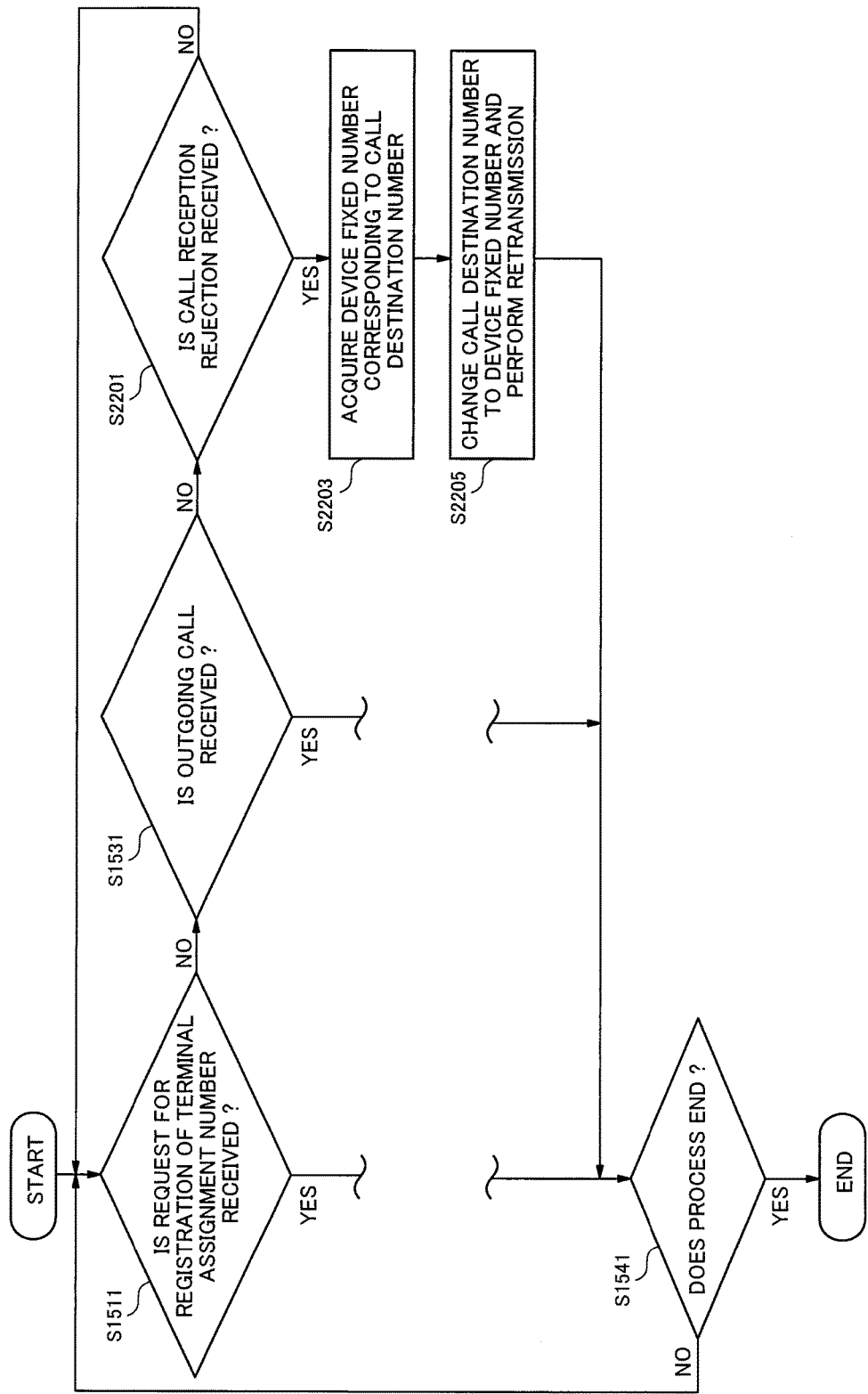
FIG. 22 is a flowchart showing a processing procedure of a private exchange server according to a fourth exemplary embodiment of the present invention.

FIG. 22 is a flowchart showing a procedure of a process performed by the private exchange server 310 according to the exemplary embodiment. In FIG. 22, the same step numbers are used for the steps of performing the same process as the process of the step shown in FIG. 15 and the description of the step will be omitted. In order to avoid a complicated figure, in FIG. 22, a part of the steps that are the same as the steps shown in FIG. 15 is omitted.

In step S2201, the private exchange server 310 determines whether or not the call reception rejection is received from the communication terminal that is the call destination. When the call reception rejection is received, the private exchange server 310 acquires the device fixed number corresponding to the call destination number in the outgoing call message in step S2203. In step S2205, the private exchange server 310 changes the call destination number of the outgoing call message to the acquired device unique number and performs the retransmission.

In addition to the effect of the first to third exemplary embodiments, by using this exemplary embodiment, an effect in which even when connection using the terminal assignment number becomes unavailable, the connection can be made available by using another number and the number of the communication terminals in an unavailable state can be reduced as much as possible can be obtained.

Fifth Exemplary Embodiment

Next, a communication processing system according to a fifth exemplary embodiment of the present invention will be described by using FIG. 23 to FIG. 27. In the communication processing system according to this exemplary embodiment, the communication terminal performs the call receiving process by using the device unique number and the private exchange server converts the outgoing call using the terminal assignment number into the call using the device unique number. This is a difference between the communication processing system according to the fifth exemplary embodiment and the communication processing system according to the second to fourth exemplary embodiment.

The configuration and operation of the communication processing system according to the fifth exemplary embodiment other than the above mentioned difference are the same as those of the communication processing system according to the second to fourth exemplary embodiments. Therefore, the description of the unit will be omitted.

In addition to the effect of the first exemplary embodiment, by using the exemplary embodiment, an effect in which the change of the user number and the role number or the like can be performed by changing data in the server with simple operation and it is not necessary to change the process of the communication terminal because it is not necessary to set the user number and the role number to the communication terminal can be obtained.

(Registration Process for Terminal Assignment Number)

Figure 23:
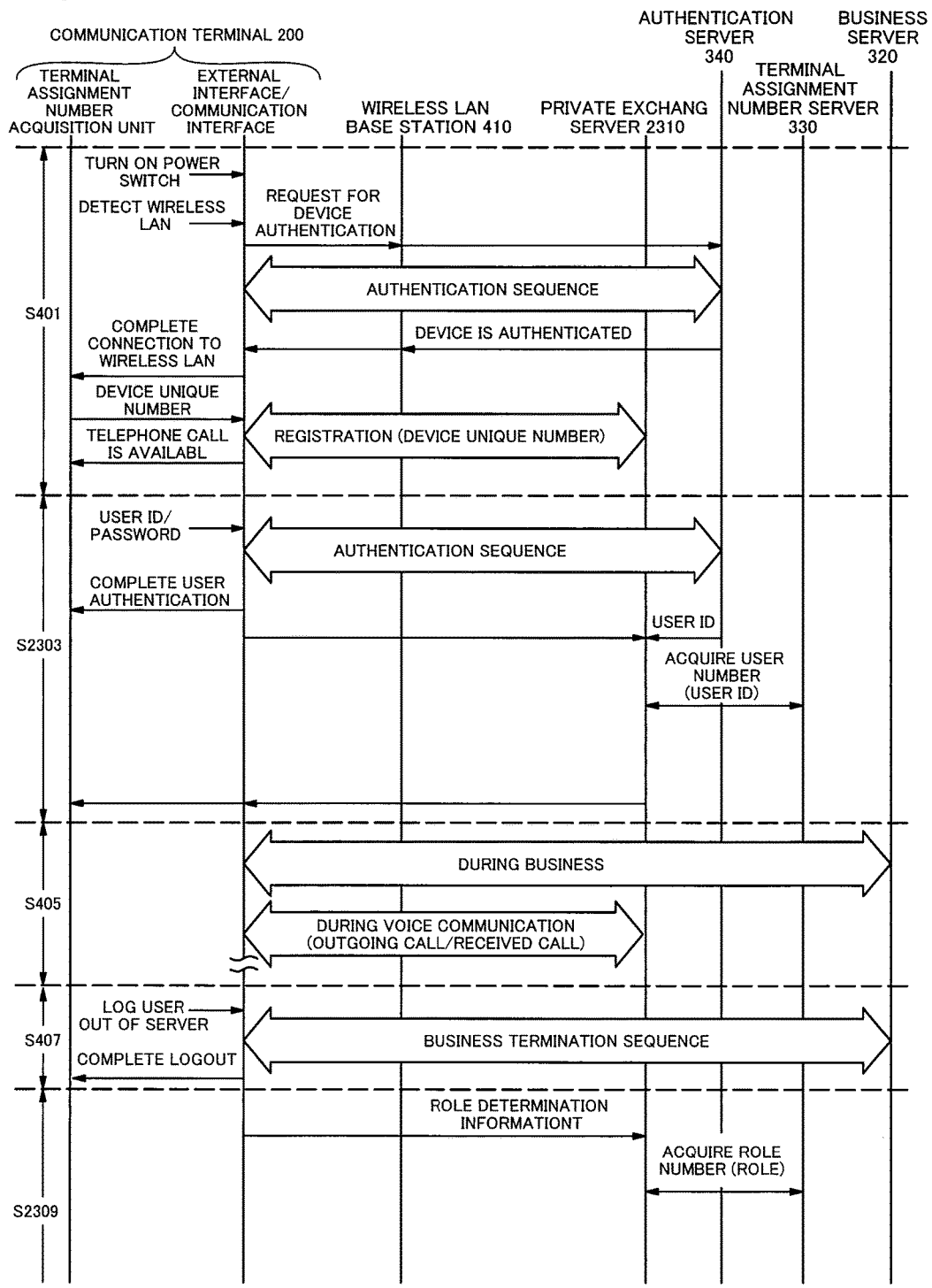
FIG. 23 is a sequence diagram showing a procedure of a process of registering a terminal assignment number by a communication terminal in a communication processing system according to a fifth exemplary embodiment of the present invention.

FIG. 23 is a sequence diagram showing a procedure of a process for registering a terminal assignment number by a communication terminal in a communication processing system according to this exemplary embodiment. Further, in FIG. 23, the same step numbers are used for the steps of performing the same process as the process of the step shown in FIG. 4 for the second exemplary embodiment and the description of the process of the step will be omitted. In the sequence shown in FIG. 23, the step (S2303) in which the login procedure is performed and the step (S2309) in which the role in the non-business mode is assigned are included instead of the steps S403 and S409 shown in FIG. 4. This is a difference from the sequence shown in FIG. 4.

In step S2303, when the user enters the user ID and the password and is logged in, first, the user authentication is performed by the authentication server 340. When the user is authenticated, a private exchange server 2310 acquires the user ID from the authentication server 340 or the communication terminal. Next, the private exchange server 2310 acquires the user number corresponding to the user ID from the terminal assignment number server 330. The private exchange server 2310 associates the device unique number registered in step S401, the IP address, and the user number with each other and stores them. The display screen of the communication terminal 200 is changed to the business mode screen 220 shown in FIG. 2.

In step S2309, the private exchange server 2310 determines the role of the communication terminal 200 on the basis of the user's input or the role determination information such as the current position of the communication terminal 200, time, and the like. Next, the private exchange server 2310 acquires the role number corresponding to the role from the terminal assignment number server 330. The private exchange server 2310 associates the device unique number registered in step 401, the IP address, and the role number with each other and stores them. The display screen of the communication terminal 200 is changed to the non-business mode screen 230 shown in FIG. 2.

(Voice Communication Process Between Communication Terminals)

Figure 24:
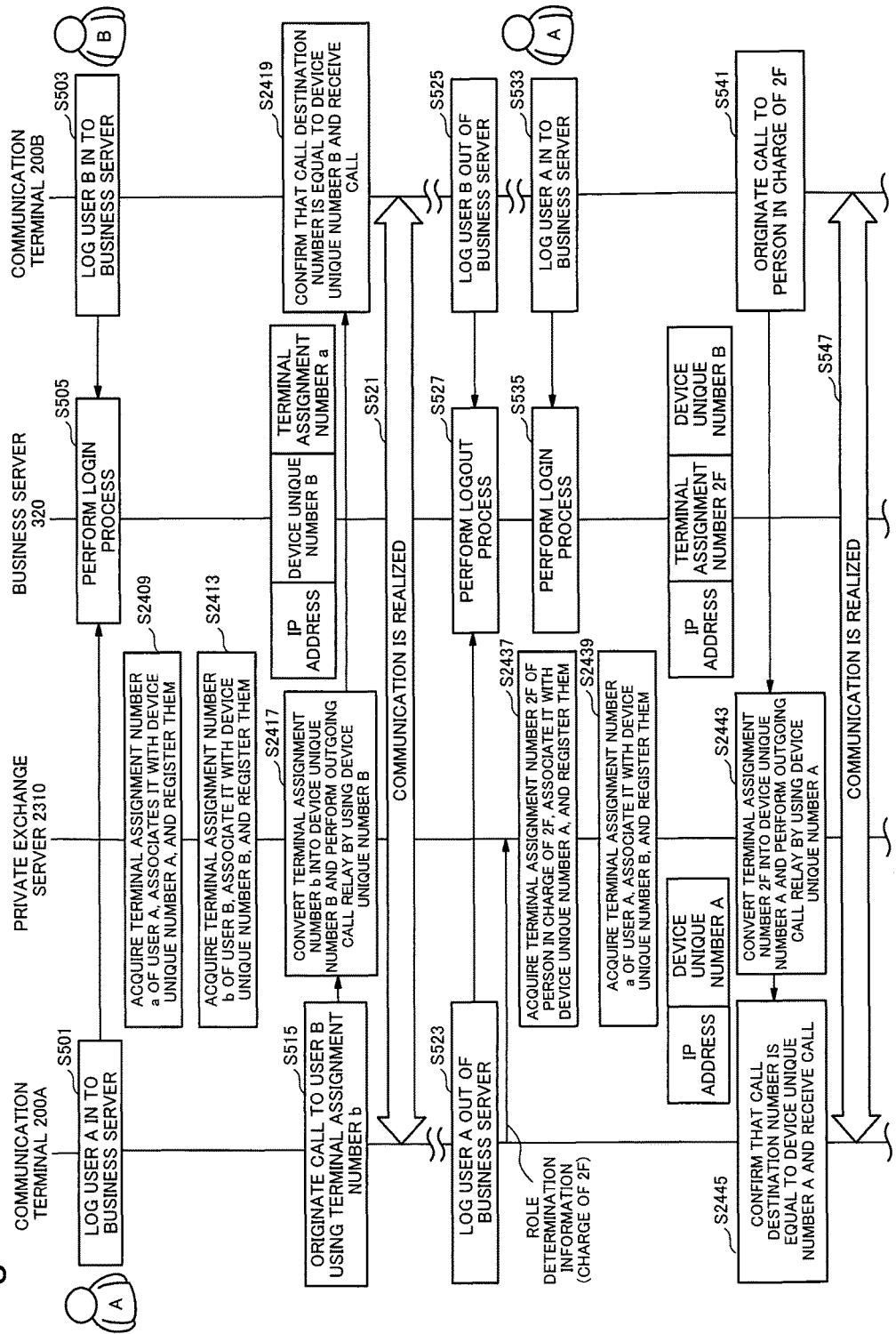
FIG. 24 is a sequence diagram showing a procedure of a voice communication process between communication terminals in a communication processing system according to a fifth exemplary embodiment of the present invention.

FIG. 24 is a sequence diagram showing a procedure of a voice communication process between communication terminals in a communication processing system according to this exemplary embodiment. Further, in FIG. 24, the same step numbers are used for the steps of performing the same process as the process of the step shown in FIG. 5 for the second exemplary embodiment and the description of the process of the step will be omitted.

When the user A is logged in by the communication terminal 200A, the private exchange server 2310 acquires the terminal assignment number a of the user A corresponds to the user ID, associates it with a device unique number A of the communication terminal 200A which is registered, and registers them in step S2409. On the other hand, when the user B is logged in by the communication terminal 200B, the private exchange server 2310 acquires the terminal assignment number b of the user B corresponds to the user ID, associates it with a device unique number B of the communication terminal 200B which is registered, and registers them in step S2413.

After this, it is assumed that the user A originates a call to the user B using the terminal assignment number b by the communication terminal 200A. The private exchange server 2310 receives the outgoing call, converts the terminal assignment number b into the associated and registered device unique number B of the communication terminal 200B, uses the device unique number B as the call destination number, and relays the outgoing call in step S2417. When the communication terminal 200B receives the call from the private exchange server 2310, it confirms that the call destination number is equal to the device unique number B and receives the call in step S2419. The voice communication is established as follows.

Further, although not shown in detail in the figure, it is desirable to convert the device unique number A of the communication terminal 200A that is the call origination source into the terminal assignment number a in the private exchange server 2310. When a such way is used, the communication terminal 200B which receives the call can recognize that the call origination source is the user A by using the telephone book on the basis of the terminal assignment number a and report it to the user B.

When the user A performs a logout process in the communication terminal 200A, the private exchange server 2310 collects the role determination information such as the current position of the communication terminal 200A, the time zone, and the like from the communication terminal 200A or another route and determines the role of the communication terminal 200A. Further, a method in which the role is determined by the communication terminal 200A and the communication terminal 200A notifies the private exchange server 2310 of a determination result may be used. In this example, it is determined that the communication terminal 200A exist in the 2F and the person carrying the communication terminal 200A is in charge of 2F. The private exchange server 2310 acquires a terminal assignment number 2F of the person in charge of 2F, associates it with the device unique number A of the communication terminal 200A, and registers them in step S2437.

When the user A who has moved is logged in by the communication terminal 200B, the private exchange server 2310 acquires the terminal assignment number a of the user A corresponding to the user ID, associates it with the device unique number B of the communication terminal 200B which is registered, and registers them in step S2439.

After this, it is assumed that the user A originates a call to the person in charge of 2F using the terminal assignment number 2F by the communication terminal 200B. The private exchange server 2310 receives the outgoing call, converts the terminal assignment number 2F into the associated and registered device unique number a of the communication terminal 200A, uses the device unique number A as the call destination number, and relays the outgoing call in step S2443. When the communication terminal 200A receives the call from the private exchange server 2310, it confirms that the call destination number is equal to the device unique number A, and receives the call in step S2445. The voice communication is established as follows.

Further, although not shown in detail in the figure, it is desirable to convert the device unique number B of the communication terminal 200B that is the call origination source into the terminal assignment number a in the private exchange server 2310. When a such way is used, the communication terminal 200A which receives the call can recognize that the call origination source is the user A by using the telephone book on the basis of the terminal assignment number a and report it to the user which receives the call by the communication terminal 200A.

(Data Format)

Figure 25:
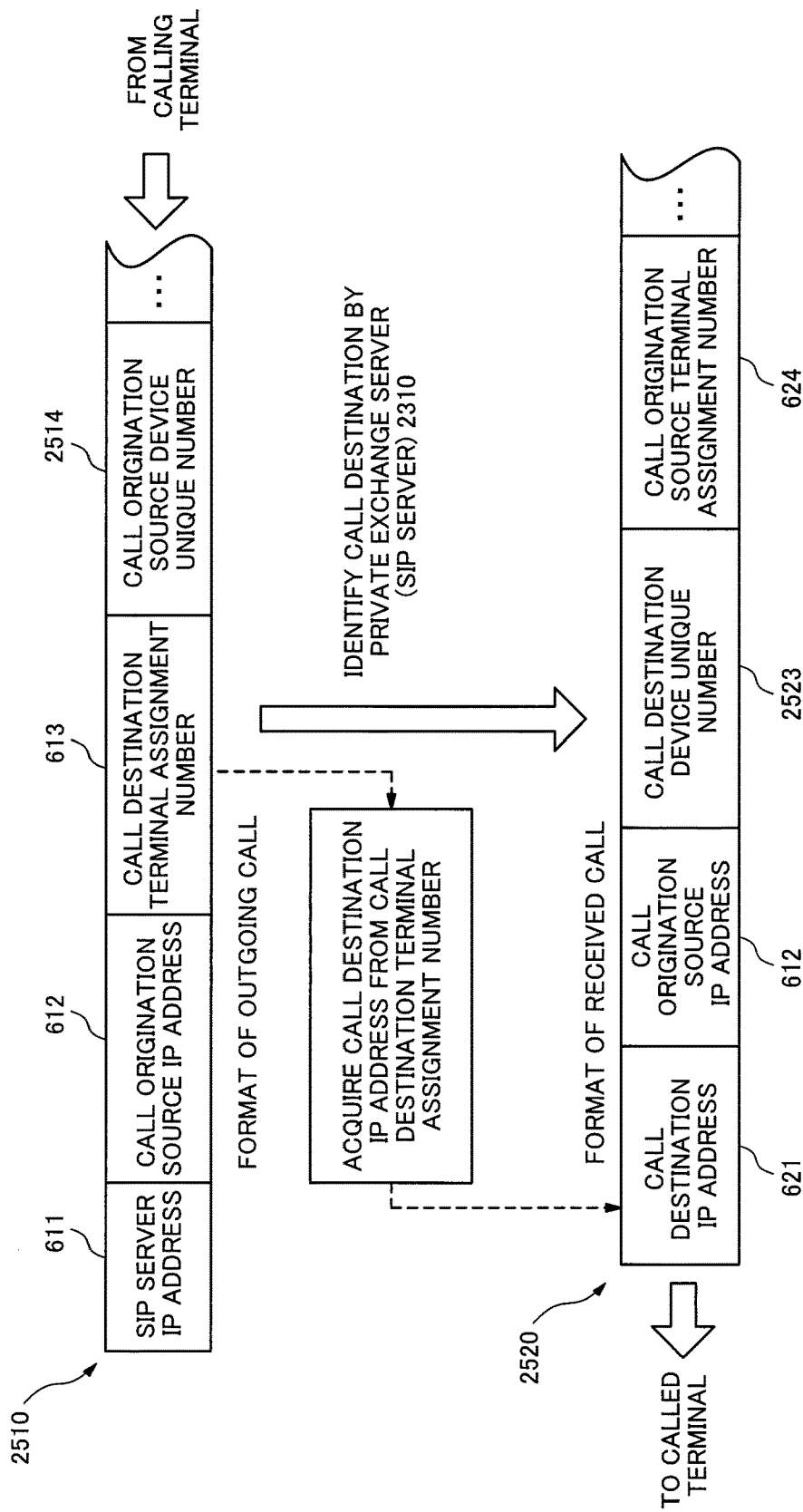
FIG. 25 is a figure showing a data format used in a voice communication process between communication terminals in a communication processing system according to a fifth exemplary embodiment of the present invention.

FIG. 25 is a figure showing a data format used in a voice communication process between communication terminals in a communication processing system according to the exemplary embodiment. Further, in FIG. 25, the same reference numbers are used for the elements of the data format having the same function as the element of the data format of the second exemplary embodiment shown in FIG. 6 and the description of the element will be omitted. FIG. 25 shows a state in which a message format 2510 sent from the calling terminal is converted into a message format 2520 sent to the called terminal by the private exchange server 2310. Further, FIG. 25 shows a simplified message format. Please refer to the standard protocol in which the detailed structure is described.

The message format 2510 sent from the calling terminal to the private exchange server 2310 includes the SIP server IP address 611, the call origination source IP address 612 of the call origination source communication terminal, the call destination terminal assignment number 613 of the call destination communication terminal, and a call origination source device unique number 2514 of the call origination source communication terminal. The private exchange server 2310 refers to the transfer table 804 on the basis of the call destination terminal assignment number 613 and acquires the call destination IP address 621 and a call destination device unique number 2523. The private exchange server 2310 refers to the transfer table 804 on the basis of the call origination source device unique number 2514 and acquires the call origination source terminal assignment number 624. The message format 2520 sent from the private exchange server 2310 to the called terminal includes the call destination IP address 621, the call origination source IP address 612, a call destination terminal assignment number 2513 of the call destination communication terminal, and the call origination source terminal assignment number 614 of the call origination source communication terminal.

Further, when the call destination terminal assignment number 613 is not included in the transfer table 804, it is determined that the user is not logged in or the role is not assigned. Further, when the call origination source terminal assignment number 624 corresponding to the call origination source device unique number 2514 is not described, the call origination source device unique number 2514 is described in the message format 2520 sent to the called terminal just as it is.

<<Functional Configuration of Private Exchange Server>>

Figure 26:
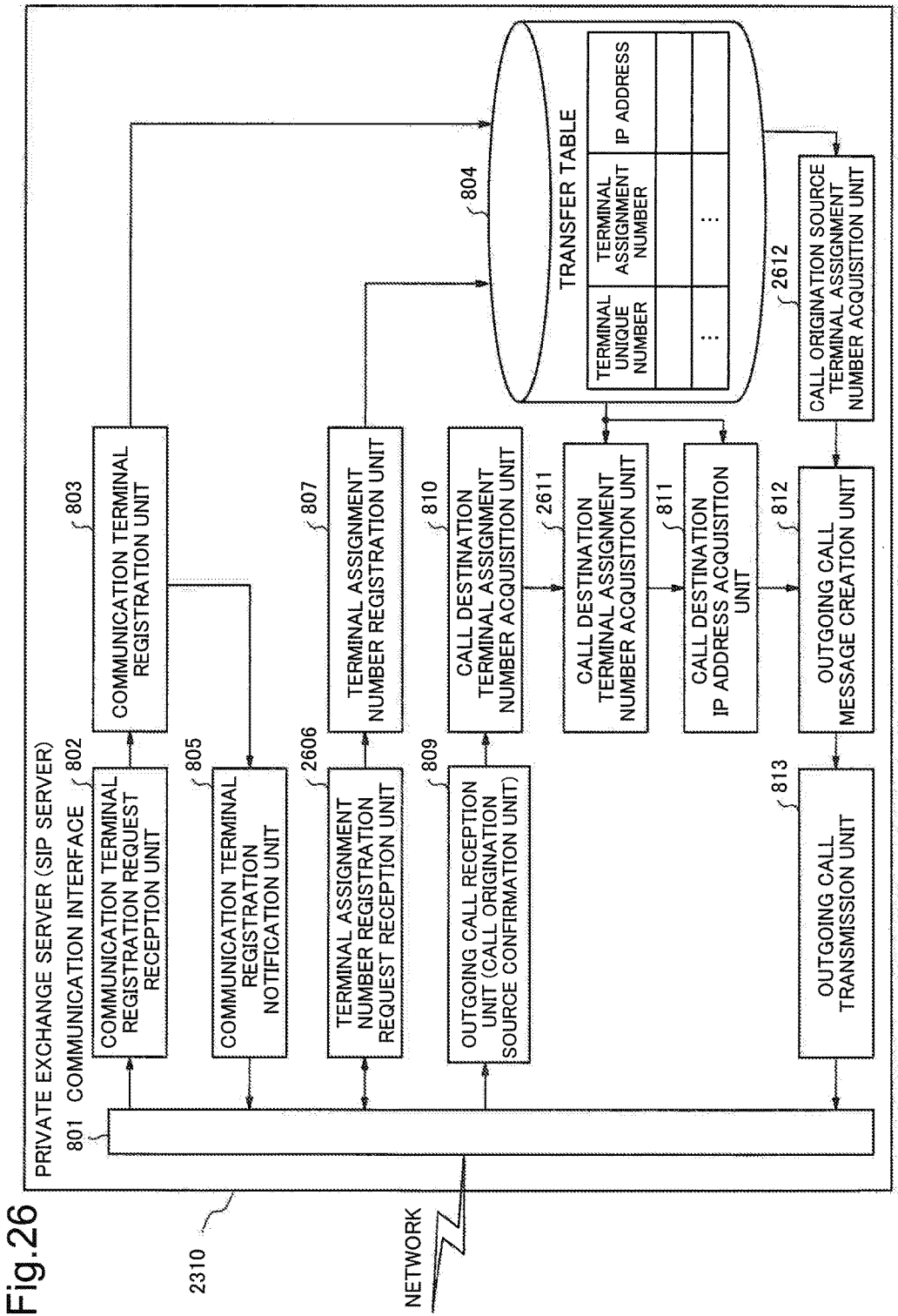
FIG. 26 is a block diagram showing a functional configuration of a private exchange server according to a fifth exemplary embodiment of the present invention.

FIG. 26 is a block diagram showing a functional configuration of the private exchange server 2310 according to this exemplary embodiment. Further, in FIG. 26, the same reference numbers are used for the components having the same function as the component of the second exemplary embodiment shown in FIG. 8 and the description of the component will be omitted.

A terminal assignment number acquisition unit 2606 acquires the terminal assignment number as a response to a registration request message from the communication terminal or the inquiry from the private exchange server 2310 to the terminal assignment number server 330 or from the current state of each communication terminal in the private exchange server 2310.

A call destination device unique number acquisition unit 2611 refers to the transfer table 804 on the basis of the terminal assignment number acquired by the call destination terminal assignment number acquisition unit 810 from the outgoing call message received by the outgoing call reception unit 809 and acquires the device unique number of the call destination.

Further, a call origination source terminal assignment number acquisition unit 2612 refers to the transfer table 804 on the basis of the device unique number of the call origination source acquired from the outgoing call message and acquires the terminal assignment number of the call origination source.

Accordingly, in the outgoing call message creation unit 812, the message format 2520 sent to the called terminal shown in FIG. 25 is created.

<<Processing Procedure of Private Exchange Server>>

FIG. 27 is a flowchart showing a processing procedure of the private exchange server 2310 according to the exemplary embodiment. This flowchart is executed by the CPU which performs a process of the private exchange server 2310 to realize the function configuration unit shown in FIG. 26. Further, in FIG. 27, the same step numbers are used for the steps of performing the same process as the process of the step shown in FIG. 15 for the second exemplary embodiment and the description of the step will be omitted.

When it is determined in step S1531 that the outgoing call is received and it is determined in step S1533 that the call origination source is registered, the private exchange server 2310 acquires the device unique number corresponding to the terminal assignment number of the call destination by referring to the transfer table 804 in step S2735. Further, the private exchange server 2310 acquires the terminal assignment number corresponding to the device unique number of the call origination source in step S2737.

Further, in this exemplary embodiment, the communication terminal uses the device unique number as the identification number of its own communication terminal. This is a difference between the second exemplary embodiment and the fifth exemplary embodiment. FIG. 7, FIG. 13, FIG. 14A, and FIG. 14B can be easily modified according to this difference. Therefore, the configuration of the communication terminal and the processing procedure are not described in detail in this exemplary embodiment.

In addition to the effect of the first exemplary embodiment, by using the exemplary embodiment, an effect in which the change of the user number and the role number or the like can be performed by changing data in the server with simple operation and it is not necessary to change the process of the communication terminal because it is not necessary to set the user number and the role number to the communication terminal can be obtained.

Another Exemplary Embodiment

In the second exemplary embodiment, a case in which the user number database and the role number database exist in the terminal assignment number server provided outside the communication terminal is shown as an example and in the third exemplary embodiment, a case in which the user number database and the role number database exist in the terminal assignment number database provided in the communication terminal is shown as an example. However, one of two databases may exist in the external server and the other may exist in the communication terminal. For example, a configuration in which the user number database exists in the communication terminal, the role number database exists in the external server, and one of the user number database and the role number database is assigned when it is needed may be used.

The invention of the present application has been described above with reference to the exemplary embodiment. However, the invention of the present application is not limited to the above mentioned exemplary embodiment. Various changes in the configuration or details of the invention of the present application that can be understood by those skilled in the art can be made without departing from the scope of the invention of the present application. Further, a system or a device in which different features of the exemplary embodiments are combined in any combination may be included in the scope of the present invention.

The present invention may be applied to a system composed of a plurality of devices or may be applied to a stand-alone device. Further, the present invention can be applied to a system or a device to which a control program to realize the function of the exemplary embodiment is directly or remotely provided. Accordingly, a control program installed in a computer to realize the function of the present invention by a computer, a medium storing the control program, and a WWW (World Wide Web) server which downloads the control program are also included in the scope of the present invention. In particular, at least, non-transitory computer readable medium is included in the scope of the present invention.

This application claims priority from Japanese Patent Application No. 2013-012680 filed on Jan. 25, 2013, the disclosure of which is hereby incorporated by reference in its entirety.

What is claimed is:

1. A communication processing system for call connection in a network, said system comprising:
   at least two communication terminals, the at least two communication terminals comprising a call origination side terminal and a call destination side terminal, each of the at least two communication terminals holding a terminal assignment number to be used as a telephone number of each of the at least two communication terminals, wherein the terminal assignment number includes one of a device unique number acquired when a device authentication is succeeded, a user number acquired when a login authentication to a business server which provides a service for business is succeeded, and a role number acquired when logged out of the business server is detected; and
   an outgoing call relay unit comprising:
      a processor; and
      storage that stores a transfer table configured to register the device unique number, the user number and the role number associated with a network address of each of the at least two communication terminals and to be used for routing a call between the call origination side terminal and the call destination side terminal, and stores program codes which, when executed by the processor, causes the outgoing call relay unit to perform:
         generating a terminating call message when an outgoing call message is received from the call origination side terminal wherein the terminating call message includes the network address of the call destination side terminal acquired from the transfer table by using the terminal assignment number included in the outgoing call message, and
         transmitting the terminating call message to the call destination side terminal,
      wherein the call destination side terminal is configured to compare the terminal assignment number included in the terminating call message with the terminal assignment number being held in own communication terminal, and to accept the terminating call message when both the terminal assignment numbers are equal.

2. The communication processing system according to claim 1, wherein each of the at least two communication terminals is configured to transmit the following terminal assignment number for registering in the transfer table of the outgoing call relay unit:
   the device unique number when the device authentication performed by power switch on operation is succeeded wherein the device unique number is originally assigned to own communication terminal,
   the user number when the login authentication to the business server by using a user identifier is succeeded wherein the user number is corresponding to the user identifier, and
   the role number when logged out of the business server is detected and is determined based on a predetermined condition including at least one of a current position of each of the at least two communication terminals and a time zone.

3. The communication processing system according to claim 2, wherein the outgoing call relay unit further performing,
   transmitting a notification of user number registration completion when the user number is registered in the transfer table; and
   transmitting a notification of role number registration completion when the role number is registered in the transfer table, and
   wherein each of the at least two communication terminals is configured to set the user number as the terminal assignment number held in own communication terminal when receiving the notification of user number registration completion, and to set the role number as the terminal assignment number held in own communication terminal when receiving the notification of role number registration completion.

4. The communication processing system according to claim 3, wherein when each of the at least two communication terminals satisfies a predetermined condition, even when a logout instruct is not issued to each of the at least two communication terminals by a user, each of the at least two communication terminals logs out of the business server.

5. The communication processing system according to claim 4, wherein the predetermined condition includes at least one of:
   a case in which each of the at least two communication terminals is in a charging state, a case in which the use of each of the at least two communication terminals is not included in a business schedule,
   a case in which the use of each of the at least two communication terminals is not included in a user's business schedule,
   a case in which each of the at least two communication terminals is not moved for a predetermined time, and a case in which each of the at least two communication terminals is not operated by a user for a predetermined time.

6. The communication processing system according to claim 2, wherein each of the at least two communication terminals is configured to reset the terminal assignment number being held in own communication terminal to the device unique number when a specific reset operation is performed by a user, and wherein the outgoing call relay unit further performing, when the reception of the terminating call message is rejected by the call destination side terminal, replacing the user number or the role number as the terminal assignment number of the call destination side terminal to the device unique number corresponding to the user number or the role number, acquired by referring to the transfer table, to be set in the terminating call message, and trying retransmission of the terminating call message to the call destination side terminal.

7. A communication processing method for a communication processing system which includes at least two communication terminals and an outgoing call relay unit, the at least two communication terminals comprising a call origination side terminal and a call destination side terminal, and each of the at least two communication terminals holding a terminal assignment number to be used as a telephone number of each of the at least two communication terminals, the outgoing relay unit comprising a transfer table used for routing a call between the call origination side terminal and the call destination side terminal and, the method comprising:

by each of the at least two communication terminals, transmitting the following terminal assignment number for registering in the transfer table of the outgoing call relay unit:

a device unique number acquired when a device authentication is succeeded wherein the device unique number is originally assigned to own communication terminal, a user number acquired when a login authentication by using a user identifier to a business server which provides a service for business is succeeded wherein the user number is corresponding to the user identifier, and a role number acquired when logged out of the business server is detected and determined based on a predetermined condition of each of the at least two communication terminals;

by the outgoing call relay unit, registering the device unique number, the user number and the role number associated with a network address of each of the at least two communication terminals;

by the outgoing call relay unit, generating a terminating call message when an outgoing call message is received from the call origination side terminal wherein the terminating call message including the network address of the call destination side terminal acquired from the transfer table by using the terminal assignment number included in the outgoing call message, and transmitting the terminating call message to the call destination side terminal; and by the call destination side terminal, comparing the terminal assignment number included in the terminating call message with the terminal assignment number being held in own communication terminal, and accepting the terminating call message when both the terminal assignment numbers are equal.

8. A communication terminal as a call origination side terminal and a call destination side terminal used in a communication processing system including an outgoing call relay unit used for routing a call between the call origination side terminal and the call destination side terminal, and holding a terminal assignment number to be used as a telephone number, said communication terminal comprising:

a CPU; and storage that stores program codes which, when executed by the CPU, causes the communication terminal to realize, an assignment number acquisition unit configured to:

acquire a device unique number when a device authentication is succeeded wherein the device unique number is originally assigned to own communication terminal, acquire a user number when a login authentication by using a user identifier to a business server which provides a service for business is succeeded wherein the user number is corresponding to the user identifier, and acquire a role number when logged out of the business server is detected and determined based on a predetermined condition of own communication terminal;

an assignment number registration control unit configured to request the outgoing call relay unit to store:

the device unique number associated with a network address of own communication terminal, and to set the device unique number as the terminal assignment number to be used for own communication terminal, the user number associated with the device unique number, and to set the user number as the terminal assignment number to be used for own communication terminal upon receiving a notification of user number registration completion from the outgoing call relay unit, and the role number associated with the device unique number, and to set the role number as the terminal assignment number to be used for own communication terminal upon receiving a notification of role number registration completion from the outgoing call relay unit; and a communication control unit, when receiving a terminating call message from the outgoing call relay unit, configured to compare the terminal assignment number included in the terminating call message with the terminal assignment number being held in own communication terminal, and to accept the terminating call message received from the outgoing call relay unit when both the terminal assignment numbers are equal, wherein the terminating call message is generated by the outgoing call relay unit based on an outgoing call message transmitted from the call origination side terminal.

9. The communication processing method according to claim 7, further comprising:

by the outgoing call relay unit, transmitting a notification of user number registration completion when the user number is registered in the transfer table, and transmitting a notification of role number registration completion when the role number is registered in the transfer table, and by each of the at least two communication terminals, setting the user number as the terminal assignment number held in own communication terminal when receiving the notification of user number registration completion, and setting the role number as the terminal assignment number held in own communication terminal when receiving the notification of role number registration completion.

10. A communication processing system for call connection in a network, said system comprising:
- at least two communication terminals, the at least two communication terminals comprising a call origination side terminal and a call destination side terminal, each of the at least two communication terminals holding a device unique number acquired when a device authentication is succeeded as a terminal assignment number to be used for a telephone number of each of the at least two communication terminals; and
- an outgoing call relay unit comprising:
- a processor; and
- storage that stores a transfer table configured to register the terminal assignment number associated with a network address of each of the at least two communication terminals and to be used for routing a call between the call origination side terminal and the call destination side terminal, and stores program codes which, when executed by the processor, causes the outgoing call relay unit to perform,
   - acquiring a user identifier used by each of the at least two communication terminals which has succeeded a login authentication to a business server which provides a service for business by using the user identifier, further acquiring the user number corresponding to the acquired user identifier from a terminal assignment number server, and registering the user number associated with the device unique number in the transfer table,
   - receiving role determination information relating to each of the at least two communication terminals which has logged out of the business server and determining a role of each of the at least two communication terminals, acquiring a role number corresponding to the determined role from the terminal assignment number server, and registering the role number associated with the device unique number in the transfer table,
   - generating a terminating call message when an outgoing call message is received from the call origination side terminal by including the network address and the device unique number of the call destination side terminal acquired from the transfer table by using the terminal assignment number included in the outgoing call message, and
   - transmitting the terminating call message to the call destination side terminal,
- wherein the call destination side terminal is configured to compare the terminal assignment number included in the terminating call message with the device unique number being held in own communication terminal, and to accept the terminating call message when the terminal assignment number and the device unique number are equal.

* * * * *